United States Patent
Fukuma et al.

[11] Patent Number: 5,971,537
[45] Date of Patent: Oct. 26, 1999

[54] LENS SPECIFYING APPARATUS

[75] Inventors: Yasufumi Fukuma; Yukio Ikezawa; Takeyuki Kato, all of Tokyo, Japan

[73] Assignee: Kabushiki Kaisha Topcon, Tokyo, Japan

[21] Appl. No.: 09/016,806

[22] Filed: Jan. 30, 1998

[30] Foreign Application Priority Data

Jan. 31, 1997 [JP] Japan .................................. 9-018730

[51] Int. Cl.$^6$ .................................................. G02C 7/10
[52] U.S. Cl. ................................................ 351/44; 356/124
[58] Field of Search ........................... 356/124, 124.5, 356/125, 128, 326, 327, 328; 351/44, 45, 47, 200

[56] References Cited

U.S. PATENT DOCUMENTS 5,489,978  2/1996  Okumura et al. ..................... 356/124
5,657,116  8/1997  Kohayakawa ......................... 356/124

*Primary Examiner*—George Manuel
*Attorney, Agent, or Firm*—Finnegan, Henderson, Farabow, Garrett & Dunner, L.L.P.

[57] ABSTRACT

A lens specifying apparatus is provided which includes a lens meter (1) for measuring and obtaining the lens refraction characteristic distribution information of a subject lens (30), an information recording/regeneration unit (104) on which lens information has been recorded, an arithmetic control circuit (101a) for comparing the lens refraction characteristic distribution information measured by the lens meter (1) with the lens information recorded on the information recording/regeneration unit (104) and judging to which lens information the measured lens refraction characteristic distribution information corresponds.

16 Claims, 35 Drawing Sheets

UTA: LESS THAN 5%
UTB: LESS THAN 5%
Visible:(UPPER HALF)
LESS THAN 70%
(LOWER HALF)
MORE THAN 70%

LENS SPECIFYING APPARATUS

BACKGROUND OF THE INVENTION

1. Field of the Invention

The present invention relates to a lens specifying apparatus that specifies, for example, the lens type, such as a far point importance type, a near point importance type, and a far-near importance type, the maker, and the kind (maker model type) of a subject lens from lens refraction characteristics, such as the refractive power distribution and astigmatism distribution of the subject lens.

2. Description of the Related Art

In recent years, progressive power lenses and far-point aspherical lenses have spread wide as eyeglass lenses. For example, the progressive power lens has a far point portion where the spherical degree does not change and a near point portion where the refractive power changes continuously from the boundary between it and the far point portion. Generally, the far point portion is roughly located on the upper side of the lens center, and the near point portion is offset slightly right and left from the lens center and roughly located on the lower side of the lens. Furthermore, the near point portion and the intermediate portion between the near point portion and the far point portion, which are actually usable, are not provided over the lower portion of the lens, rather extend from the lens center to the lower edge in a relatively narrower width.

However, for the position, configuration, and refractive power variations from the intermediate portion to the near point portion, in the present condition, various types are available in correspondence with the environment in which eyeglasses are used. Also, even in the case of the same type and even in the case of the same maker there are a wide variety of model types.

Therefore, if a person wearing eyeglasses consisting of progressive power lenses of a certain model type wears eyeglasses consisting of progressive power lenses of a different type, there will be cases where a person cannot get accustomed to eyeglasses and will feel usage is poor.

However, since few people memorize the maker and model type of such eyeglasses, it is difficult to select the same lens in the case where a new lens is put in an eyeglass frame when eyeglasses are damaged, In addition, a multiplicity of eyeglass types have been employed in correspondence with places where eyeglasses are used. For example, there are sport types, driving types, and indoor types (far-near type, intermediate near point type, near point type, far point type, etc.). However, the number of cases where it is unknown which type of eyeglasses is currently used is not few. For example, in the case where eyeglasses currently being used is an intermediate near point type, if the eyeglasses are used in driving a vehicle due to no knowledge of the eyeglass type, there will be cases where the driver will feel eye fatigue. In such a case, it cannot be judged what cause gives rise to eye fatigue.

SUMMARY OF THE INVENTION

It is an object of the present invention to provide a lens specifying apparatus which is capable of determining lens information easily and quickly.

To achieve this end, there is provided a lens specifying apparatus comprising: lens measurement means for measuring and obtaining lens refraction characteristic distribution information of a subject lens; information recording means on which lens information, including the lens refraction characteristic distribution information, has been recorded; lens judgment means for comparing the lens refraction characteristic distribution information measured by the lens measurement means with the lens information recorded on the information recording means and judging to which lens information the measured lens refraction characteristic distribution information corresponds; and display means for displaying and notifying a result judged by the lens judgment means.

The information that is obtained from the lens information by the lens judgment means may be a maker's name. The information that is obtained from the lens information by the lens judgment means may also be a maker's name and a model type.

The information recording means may record lens usage purpose information as lens information in correspondence with the lens refraction characteristic distribution information, and the information that is obtained from the lens information by the lens judgment means may be a lens usage purpose.

The lens specifying apparatus may further comprise ophthalmic information input means for inputting ophthalmic information of a subject. The lens judgment means may add the ophthalmic information to the lens refraction characteristic distribution information and may compare the added information and the lens information with each other to obtain the lens usage purpose.

The lens specifying apparatus may further comprise usage purpose input means for inputting a usage purpose, such as an indoor purpose, a sport purpose, and a driving purpose. The lens judgment means may judge whether or not the lens usage purpose obtained is suitable for the usage purpose input by the usage purpose input means.

The lens measurement means may be equipped with means for obtaining spectral transmittance. In this case, the lens measurement means comprises a refraction characteristic measurement optical system for measuring refraction characteristics of the subject lens and a spectral transmittance measurement optical system for measuring spectral transmittance of the subject lens. The spectral transmittance measurement optical system has a part of an optical path in common with the refraction characteristic measurement optical system.

The lens judgment means may be constructed to instruct the display means to display the spectral transmittance of the subject lens measured by the lens measurement means.

The lens measurement means may further comprise a light source for projecting a measuring beam of light onto the subject lens, a light receiving portion for receiving the measuring beam which has passed through the subject lens, and transmitted-wavelength selecting means disposed as means for obtaining spectral transmittance in an optical path between the light source and the light receiving portion. The lens judgment means may be constructed to obtain refraction characteristics and spectral transmittance of the subject lens, based on an output from the light receiving portion, and instruct the display means to display the obtained refraction characteristics and spectral transmittance.

The lens judgment means may be set so as to judge whether the subject lens is a spherical lens or an aspherical lens, by a spherical degree value distribution on the subject lens. Alternatively, the lens judgment means may be set so as to judge whether the subject lens is a spherical lens or an aspherical lens, by a spherical degree value and a prism value on the subject lens. The lens judgment means may be constructed to calculate a degree of an aspherical surface from an optical center of the subject lens and instruct the display means to display the degree thereof. Also, the lens judgment means may be set to judge whether the subject lens is an aspherical progressive lens or an aspherical mono-focal lens, based on a difference between spherical degree values of at least two points on the subject lens, and instruct the display means to display a judgment result. Further, optical characteristics of the subject lens may be measured at intervals of time and at a plurality of points on the subject lens. dr

BRIEF DESCRIPTION OF THE DRAWINGS

The present invention will be described in further detail with reference to the accompanying drawings wherein.

Figure 34:
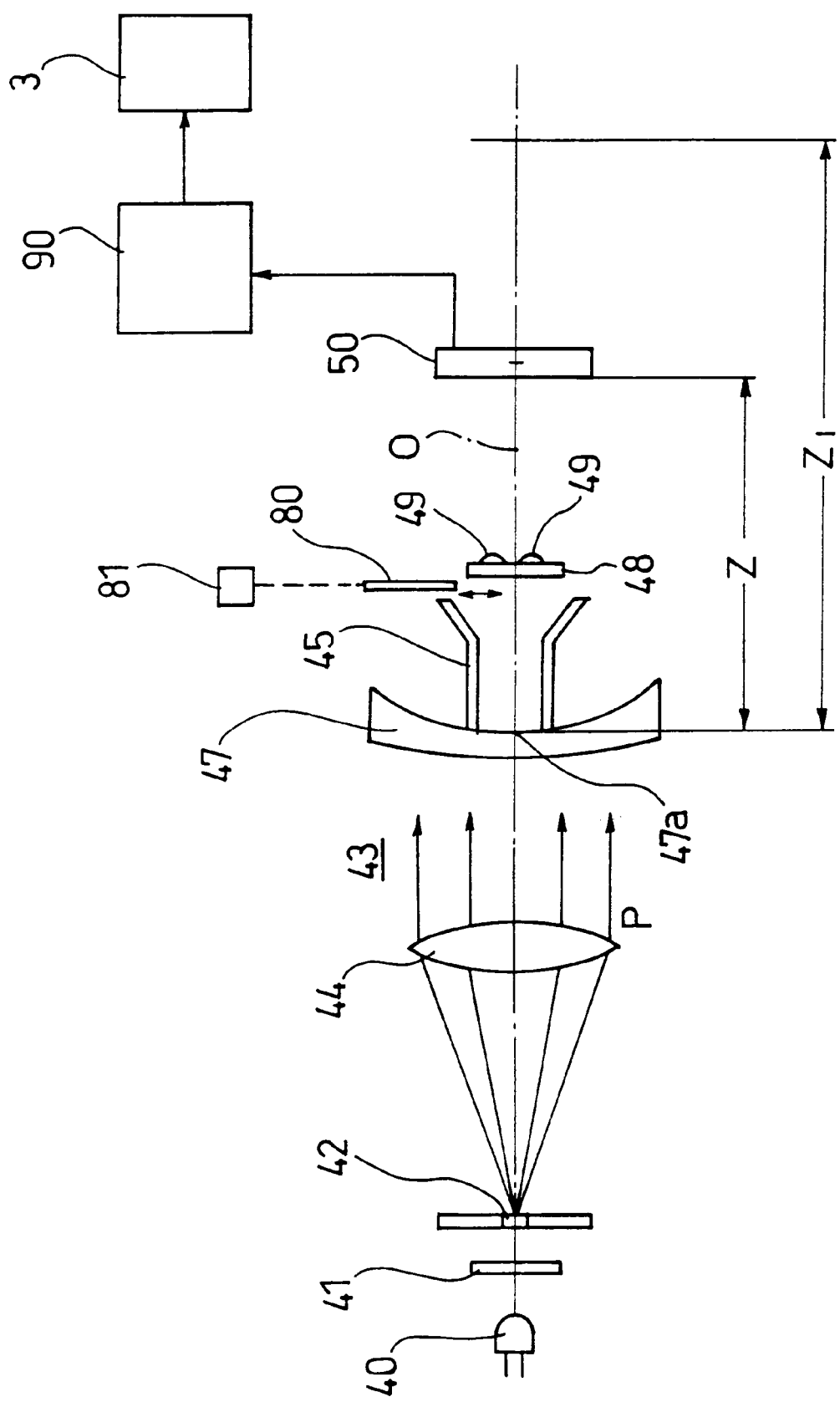
FIG. 34 shows a schematic optical system of another lens meter used as a lens specifying apparatus according to the present invention.
Figure 35:
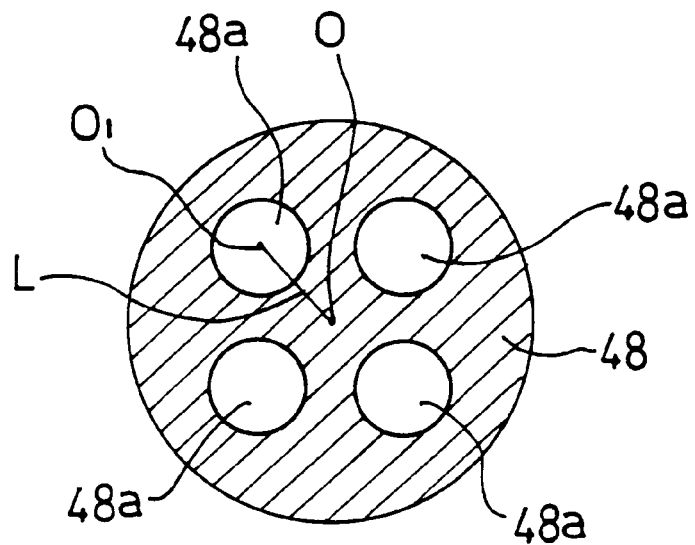
FIG. 35(a) shows a pattern for measuring optical characteristics of FIG. 34.
FIG. 35(b) shows a filter plate for measuring spectral characteristics of FIG. 34.
Figure 35:
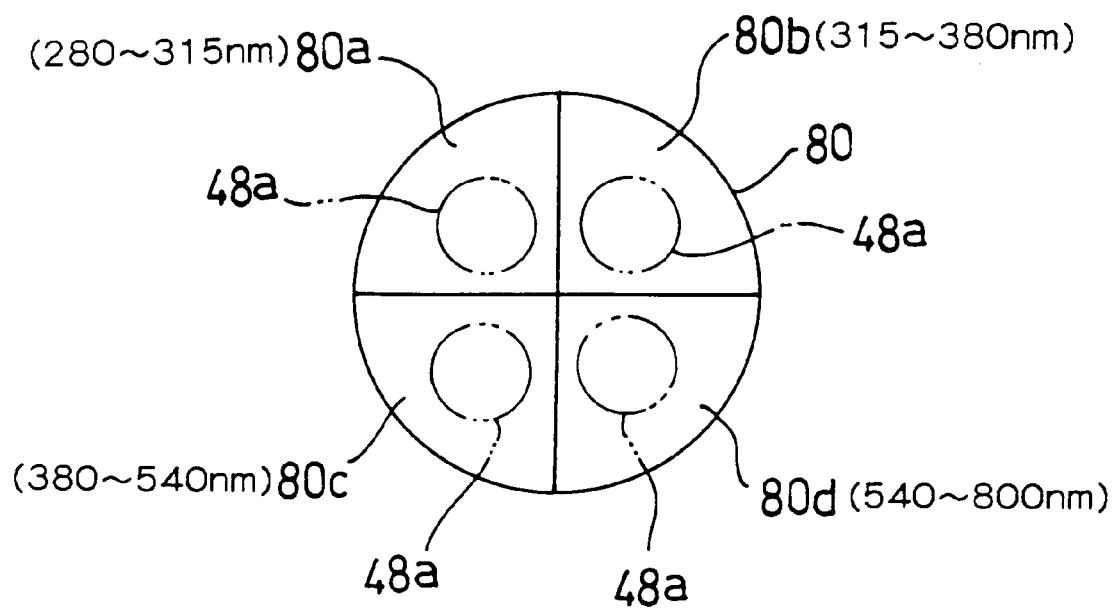
Figure 40:
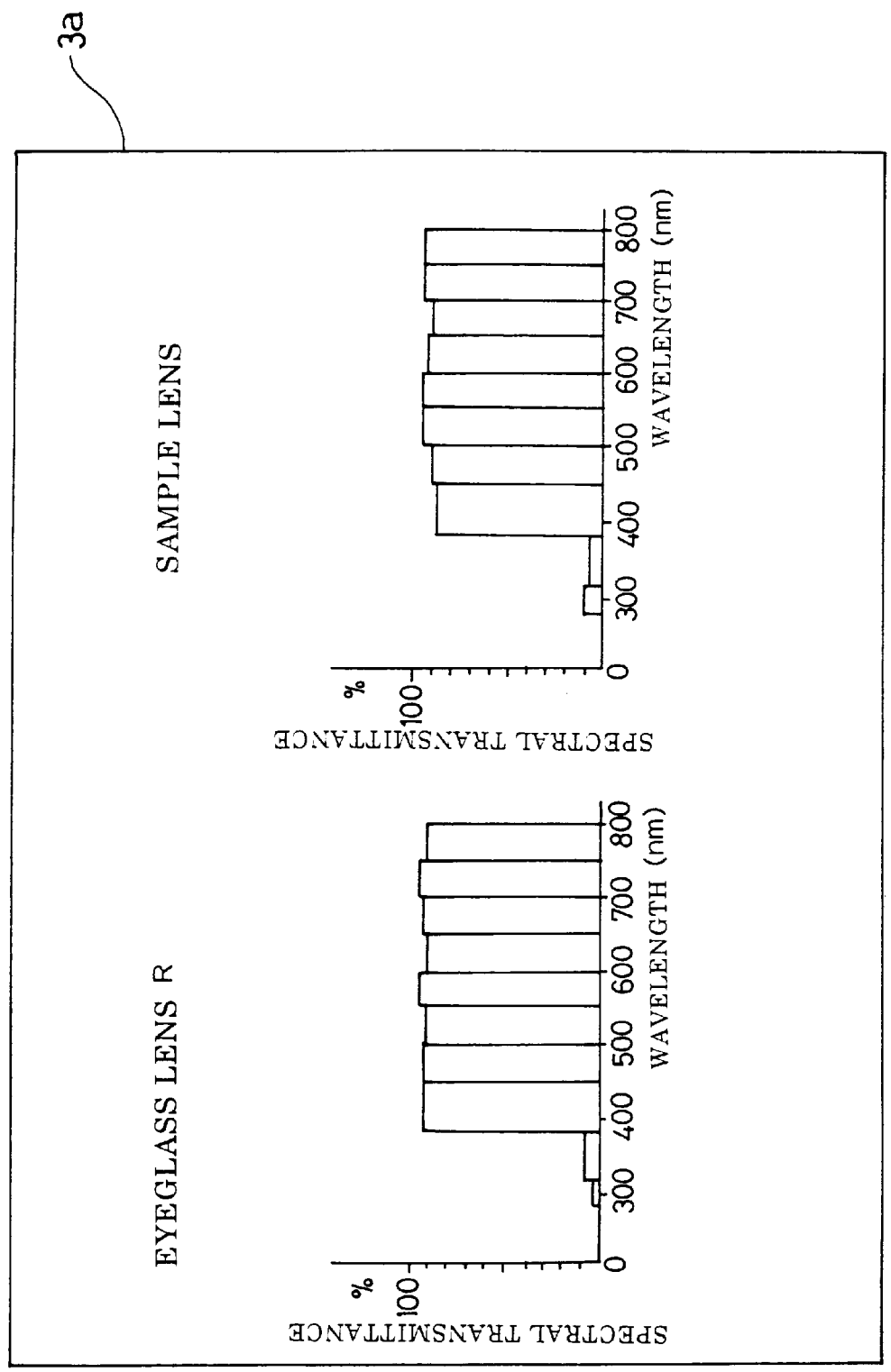
Figure 41:
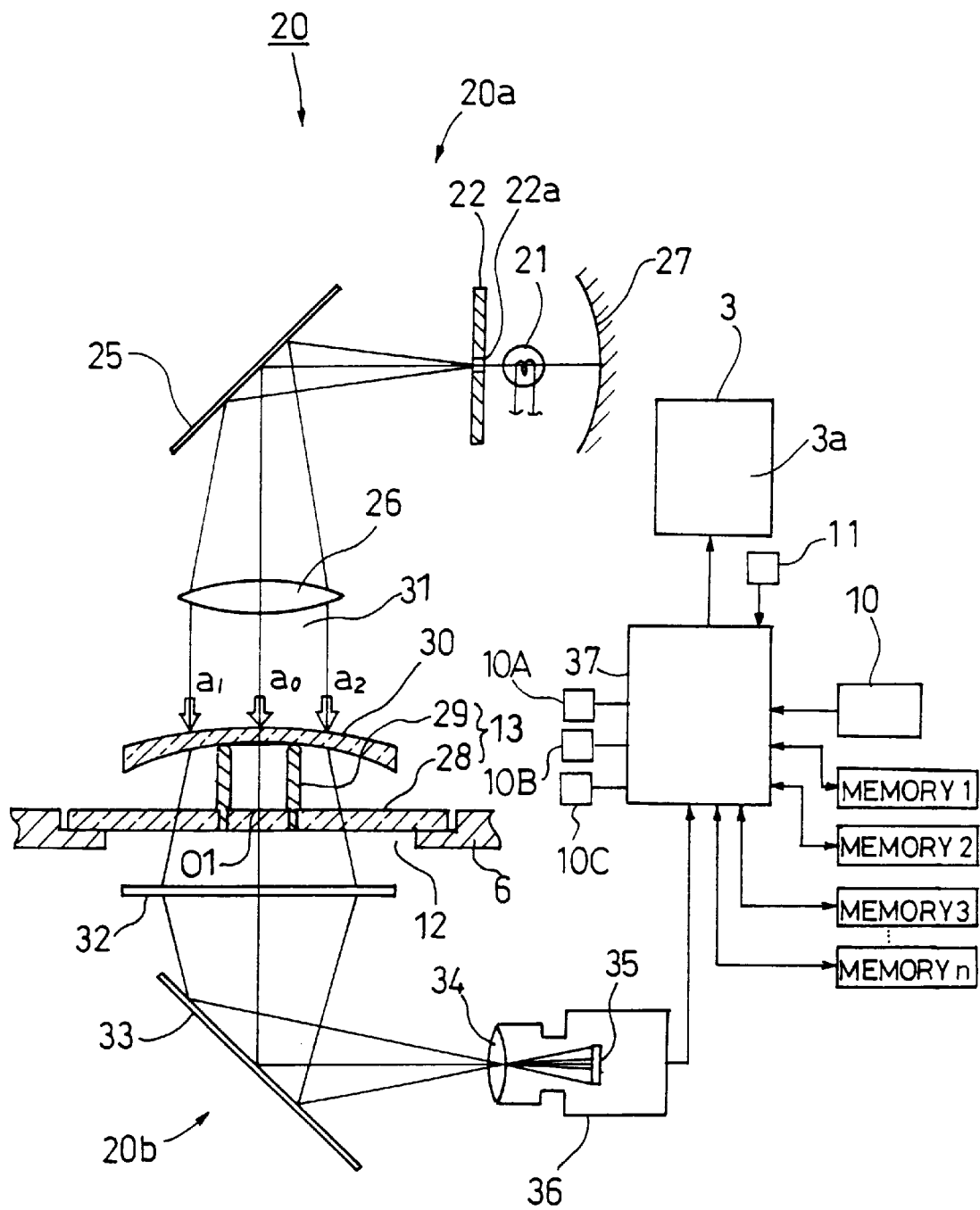
Figure 42:
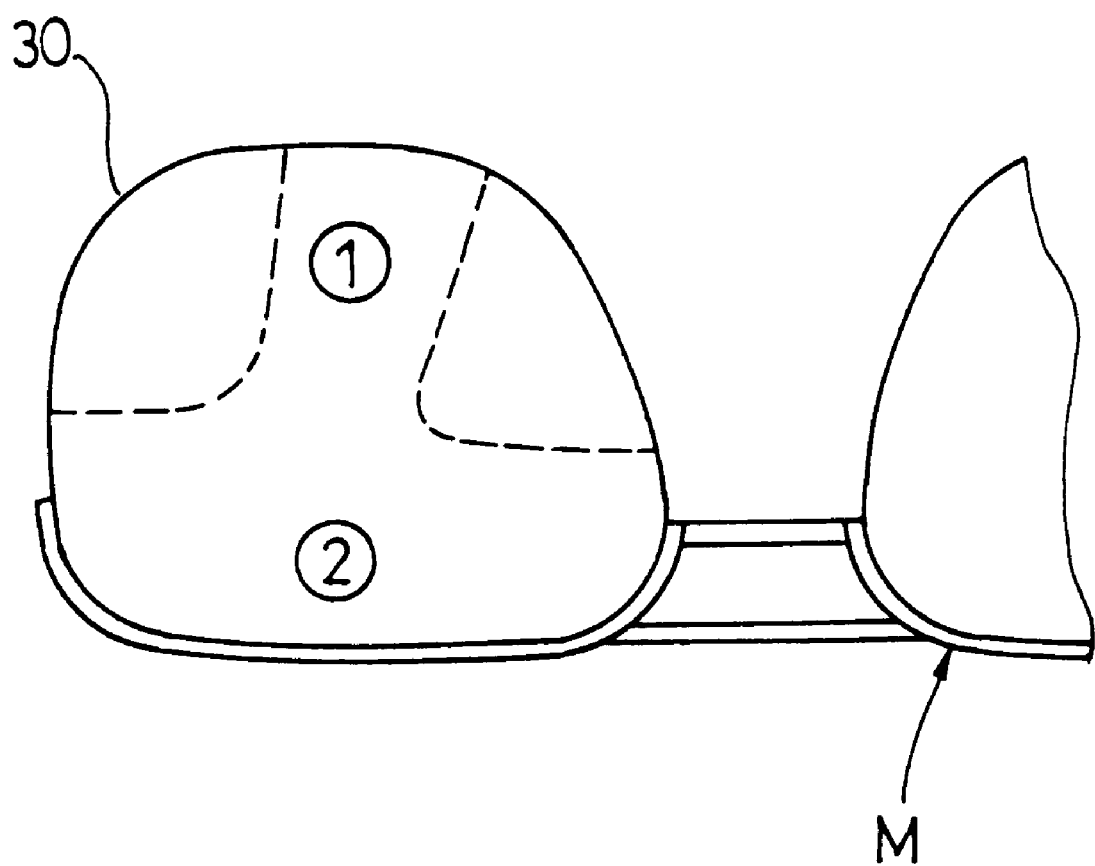
Figure 43:
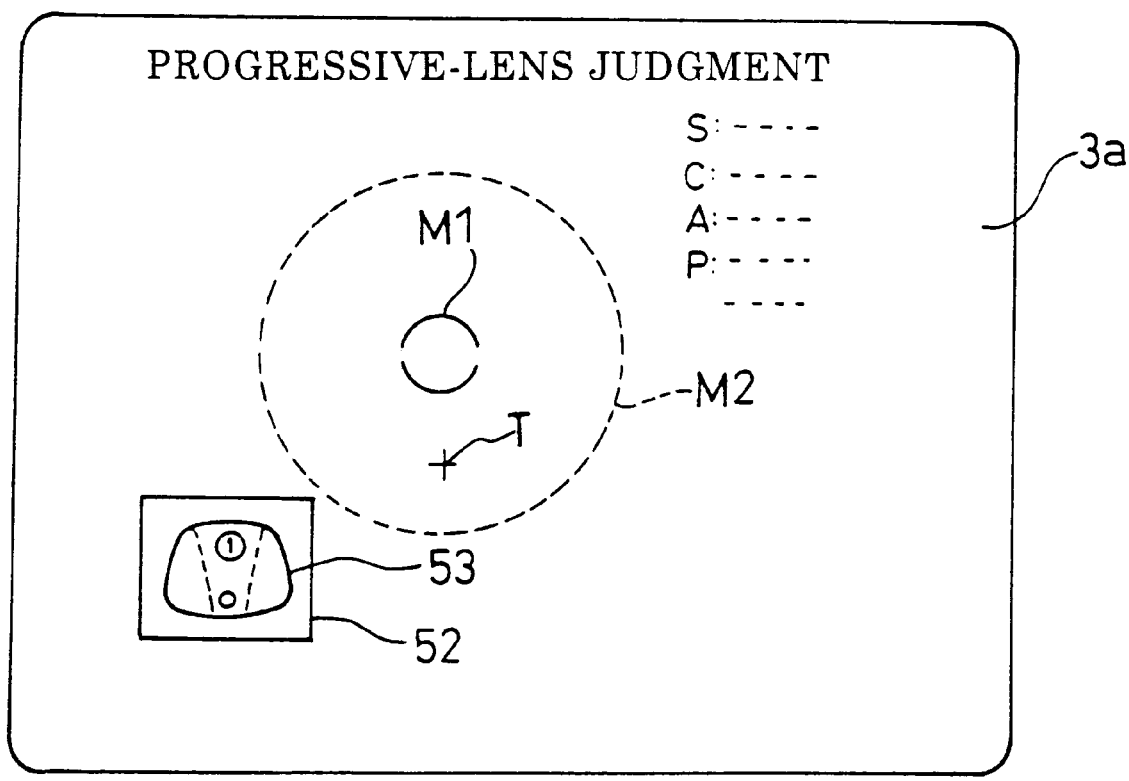
Figure 44A:
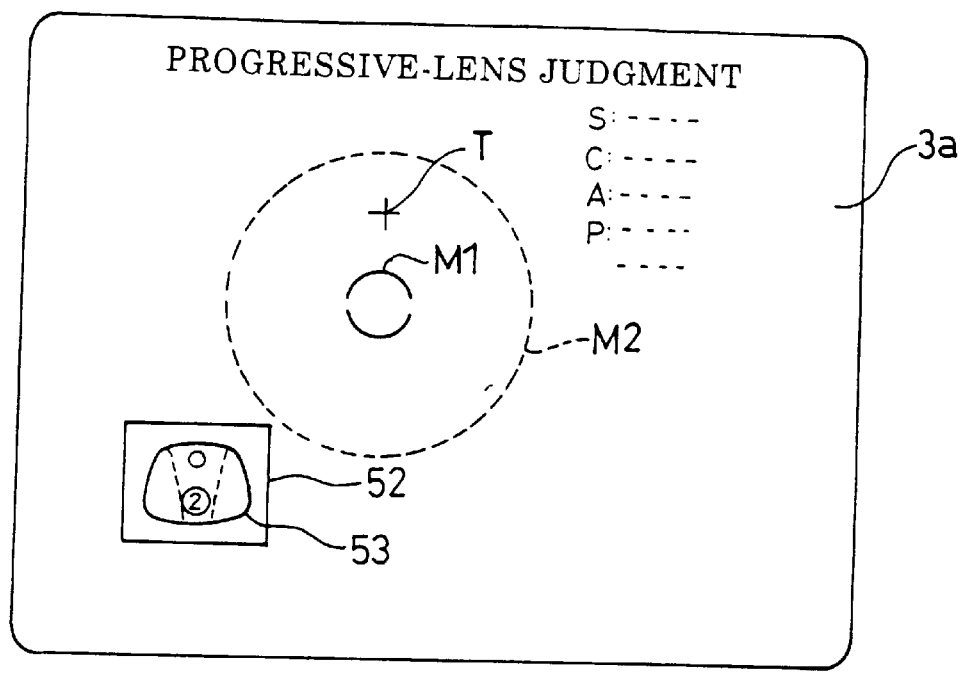
Figure 44B:
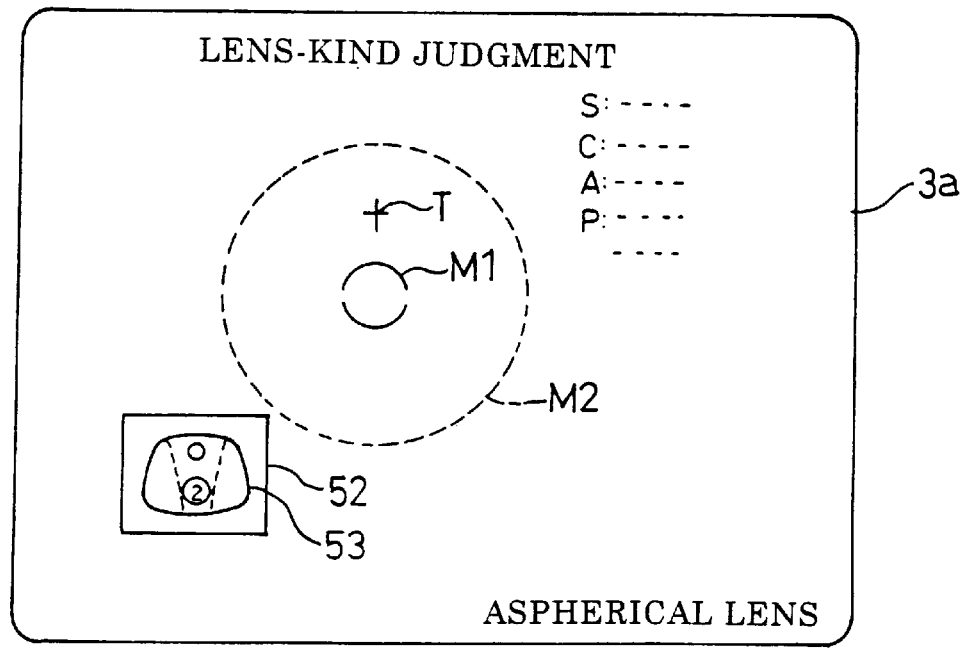
Figure 45:
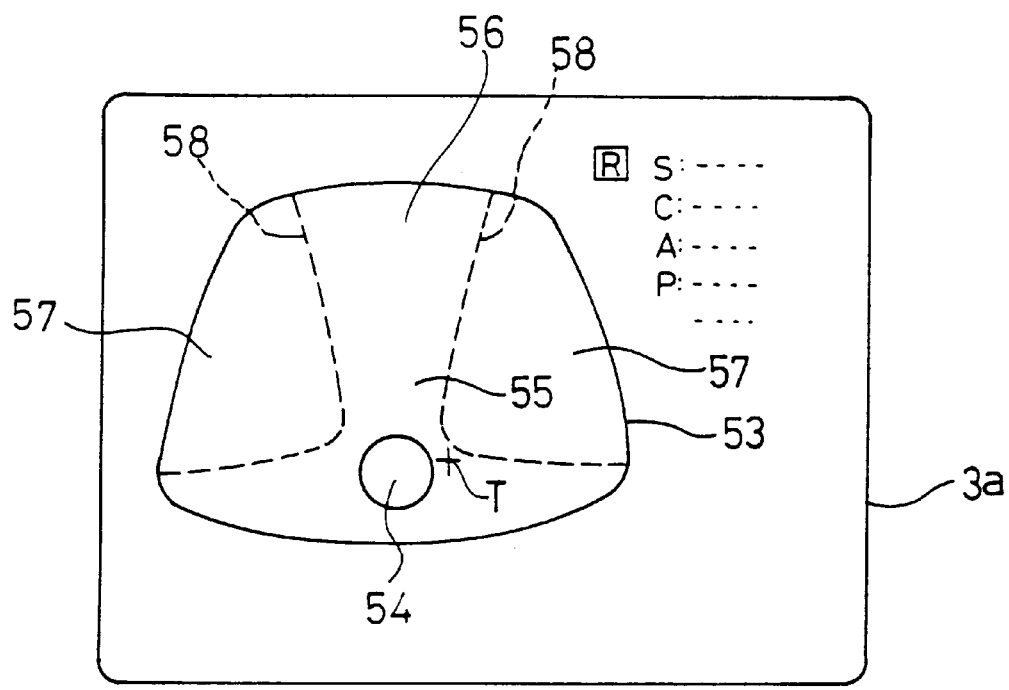
Figure 46:
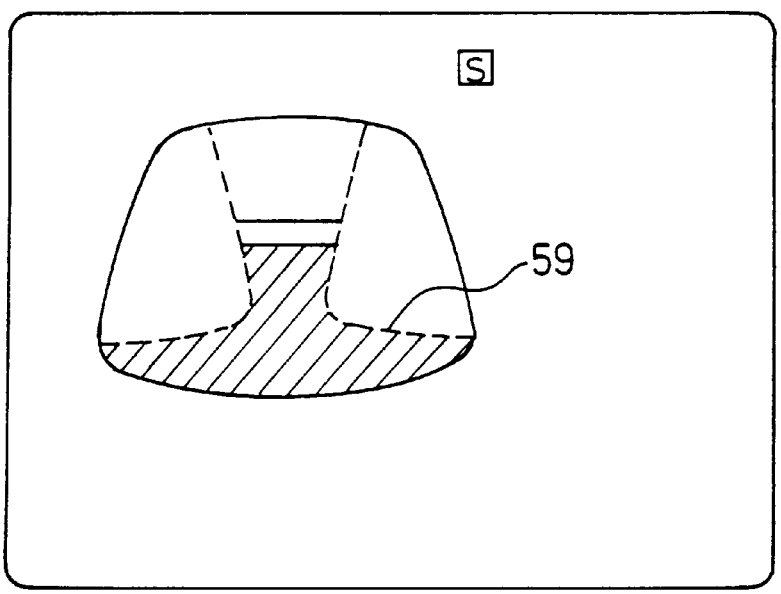

PIG. 39 shows another display example of spectral characteristics by the use of the optical system of FIG. 34;

FIG. 40 shows still another display example of spectral characteristics by the use of the optical system of FIG. 34;

FIG. 41 shows another optical system of the lens meter;

FIG. 42 shows a subject lens to be measured by the optical system of FIG. 41;

FIG. 43 shows an example displayed on a display portion of the lens meter by the use of the optical system of FIG. 41;

FIG. 44(a) shows another example displayed on the display portion of the lens meter by the use of the optical system of FIG. 41;

FIG. 44(b) shows still another example displayed on the display portion of the lens meter by the use of the optical system of FIG. 41;

FIG. 45 shows still another example displayed on the display portion of the lens meter by the use of the optical system of FIG. 41; and FIG. 46 shows still another example displayed on the display portion of the lens meter by the use of the optical system of FIG. 41

DETAILED DESCRIPTION OF THE PREFERRED EMBODIMENTS

Embodiments of a lens specifying apparatus according to the present invention will hereinafter be described in detail in reference to the drawings.

(1) First Embodiment

Rough Structure of Apparatus

Figure 1:
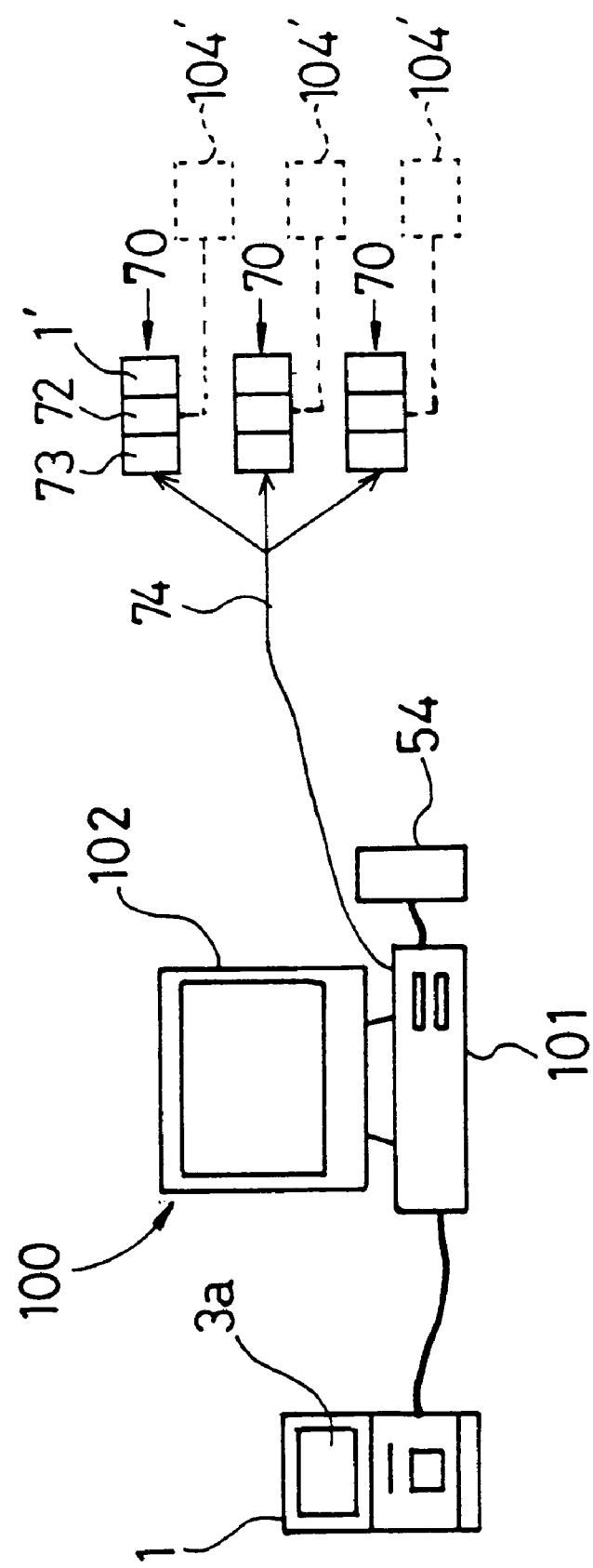
FIG. 1 is a schematic view showing a lens specifying apparatus according to the present invention.
Figure 2:
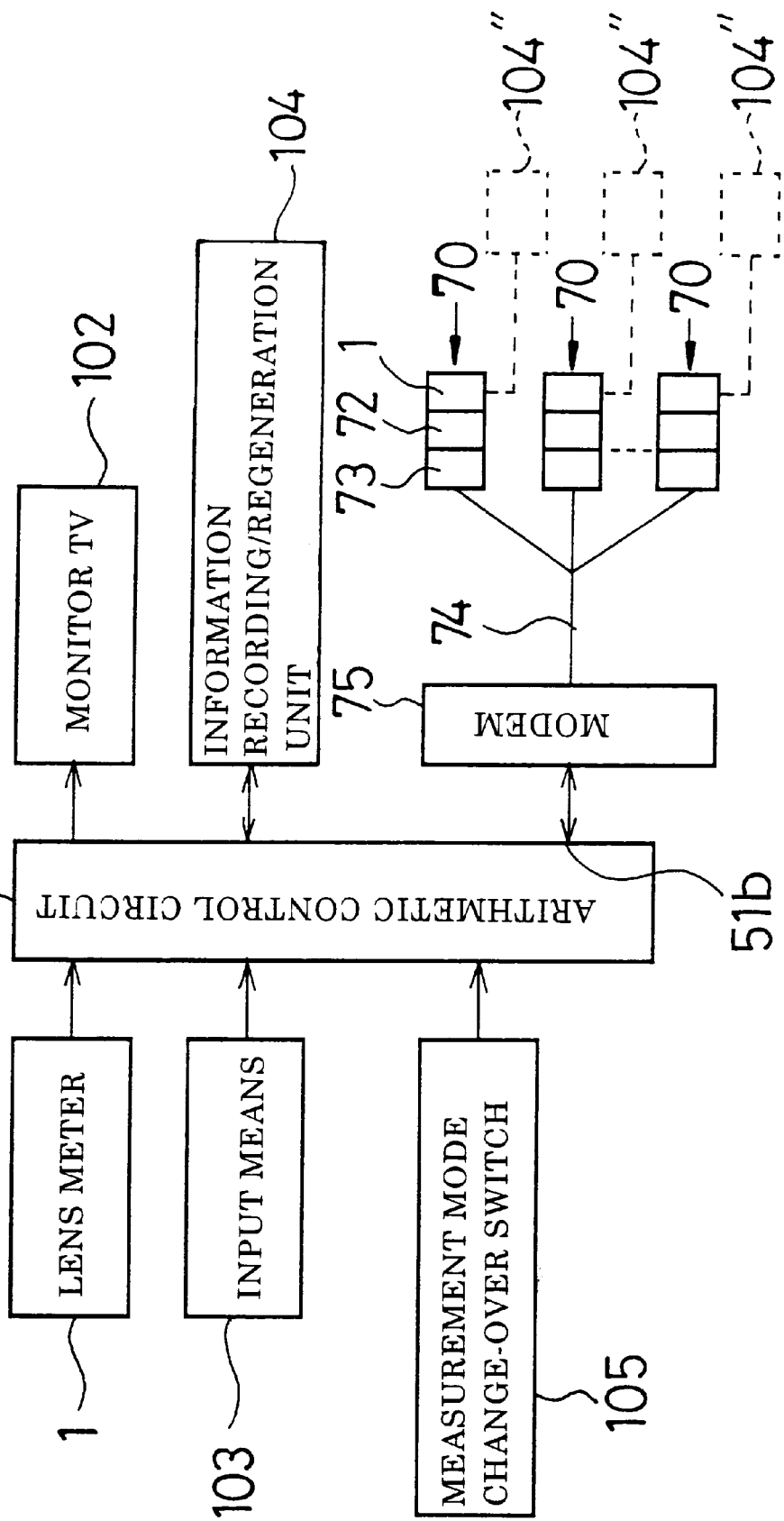
FIG. 2 is a block diagram showing the control circuit of the lens specifying apparatus shown in FIG. 1.

In FIG. 1 reference numeral 100 denotes a host computer (hereinafter referred to as simply a computer) installed on a maker or a specific site. The computer 100 has a main body 101 used as lens judgment means and a TV monitor 102 used as notification means (display means). The TV monitor 102 is equipped with an arithmetic control circuit 101a as lens judgment means, as shown in FIG. 2.

In the figure, the TV monitor 102 and input means 103 are connected to the arithmetic control circuit 101a. The input means 103 includes, for example, a keyboard, an IC card reader, and an interface (not shown) connected to the output portion of an ophthalmic unit such as an ophthalmometer and a refractometer. Also, an information recording/regeneration unit (information recording means) 104 and a measurement mode change-over switch 105 are connected to the arithmetic control circuit 101a. The input means 103 is employed to input data of subject eye information, such as refraction characteristics of a subject eye, and lens information.

The keyboard (not shown) is employed to input data of subject eye information such as a refraction characteristic of a subject eye, data (prescribed value) of a prescription based on an eye examination, and the purpose of eyeglasses usage. This keyboard is used as data input means in the case where data of a prescription based on an eye examination is input, and is employed as usage purpose input means in the case where the purpose of eyeglasses usage is input. The usage purpose includes, for example, a reading purpose (indoor purpose), a driving purpose, and a sport purpose.

The IC card reader (ophthalmic data input means) reads out the eye refractive power of a subject from an IC card on which the eye refractive power information of a subject has been recorded, and inputs the read refractive power to the arithmetic control circuit 101a.

In the case where the eye refractive power of a subject is unknown, a refraction characteristic such as the eye refractive power of a subject is measured with an ophthalmic unit (ophthalmic data input means) such as an ophthalmometer and a refractometer, and the measurement result is input to the arithmetic control circuit 101a through the interface (not shown) connected to the output portion of the ophthalmic unit.

The information recording/regeneration unit 104 employs a large capacity storage (information recording/regeneration means), such as an optical disk unit, a magneto-optical disk, and a hard-disk drive. The measurement mode change-over switch 105 is employed to switch the arithmetic control circuit 101a between a progressive power lens measurement mode and a lens usage type measurement mode.

The information recording/regeneration unit 104 is used to store very large quantities of lens information. This lens information includes lens refraction characteristics, model types, makers, and lens usage purpose information corresponding to refraction characteristics of a subject lens.

The lens refraction characteristics include, for example, the refractive power distribution and astigmatic distribution of a subject lens 30. As the refractive power distribution of the subject lens 30, there is the total refractive power distribution (total refractive power data) of the subject lens 30 such as those shown in FIGS. 3 and 4 through 7, or the partial refractive power (partial refractive power data) of the subject lens 30.

The partial refractive power (portion refractive power) data may be the refractive power data of a far point 201a (portion of a far point portion 201) and the refractive power data of a near point 202a (portion of a near point portion 202) or may be only the position data of the near point 202a with respect to the position of the far point 201a. Also, as shown in FIG. 3, the partial refractive power data may be the partial refractive power data of a plurality of positions of the subject lens 30, that is, points P1 through P9 disposed vertically and horizontally at equal pitches.

Figure 3:
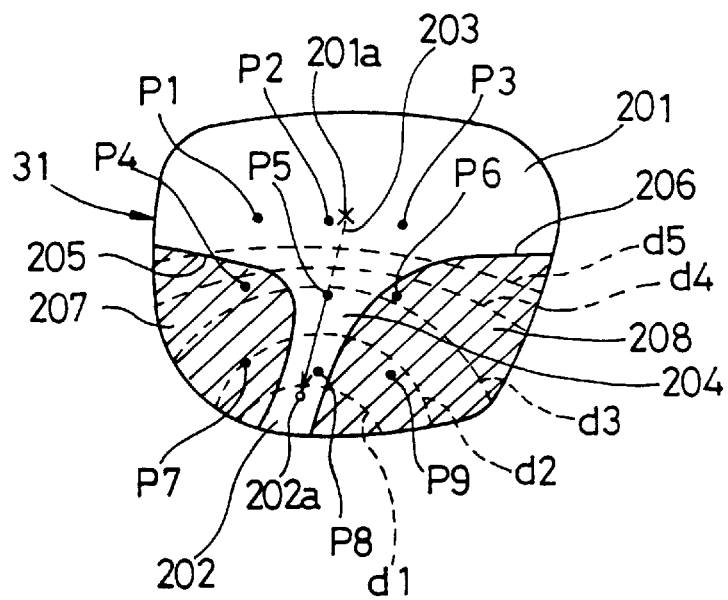
FIG. 3 is an explanatory diagram showing an example of the lens refraction characteristic distribution information of a subject which is measured by the lens specifying apparatus shown in FIG. 1.
Figure 4:
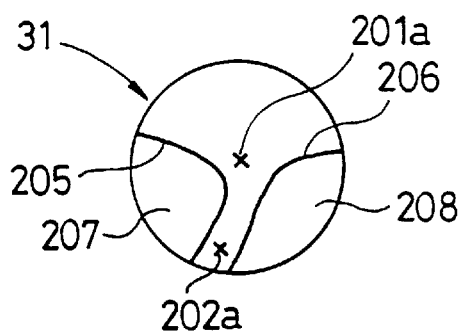
FIG. 4 is an explanatory diagram showing another example of the lens refraction characteristics.
Figure 5:
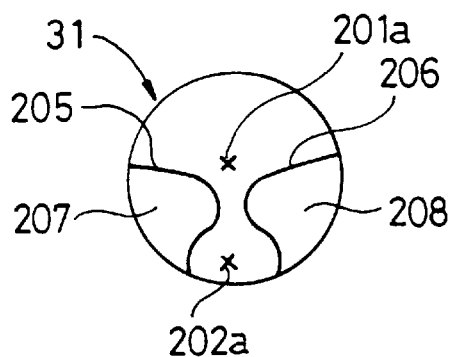
FIG. 5 is an explanatory diagram showing still another example of the lens refraction characteristics.
Figure 6:
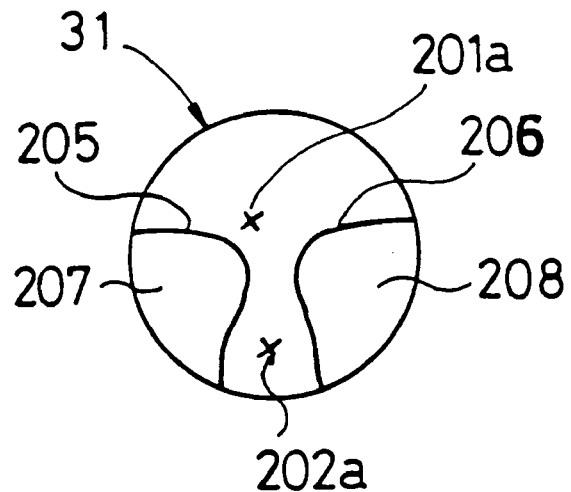
FIG. 6 is an explanatory diagram showing a further example of the lens refraction characteristics.
Figure 7:
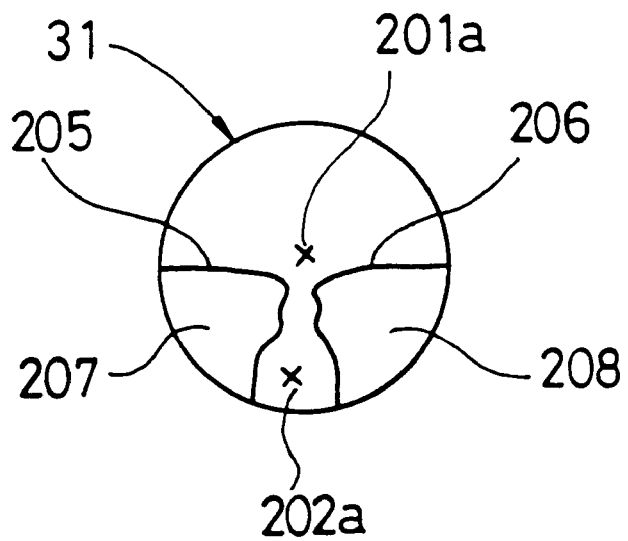
FIG. 7 is an explanatory diagram showing a further example of the lens refraction characteristics.

In FIG. 3 reference numeral 202 denotes a virtual line linking the far point 201a and the near point 202a together. Reference characters d1 through d5 each denote the constant degree line of a spherical degree. 204 is a progressive portion between the far point portion 201 and the near point portion 202. 205 and 206 are constant degree lines where a cylindrical degree (cylindrical refraction characteristic value) is 0.25, respectively. The left-side portion indicated by oblique lines 207 is an area which is defined by the constant degree line 205, far point portion 201, progressive portion 204, and the near point portion 202, and in that left-side portion, a cylindrical degree C and an axial angle A change considerably. Likewise, the right-side portion indicated by oblique lines 208 is an area which is defined by the constant degree line 20G, far point portion 201, progressive portion 204, and the near point portion 202, and in that area, the cylindrical degree C and the axial angle A change considerably.

As the lens usage purpose information corresponding to lens refraction characteristics, there are eyeglass types which are employed in correspondence with the place where eyeglasses are used. The eyeglass types include, for example, a sport type, a driving type, and an indoor type (far-near type, intermediate near type, near point type, and far point type). In this case, since the refractive power of a lens usage purpose is obtained in view of the refractive power of a subject eye and the refractive power of a subject lens, the refractive power of a lens usage purpose will be recorded as usage purpose information on the information recording/regeneration unit 104 in correspondence with an eyeglass type. Note that the material of a subject lens can also be input as lens information.

Also, to the arithmetic control unit 101*a* a lens meter 1 is connected. The lens meter 1 serves as lens measurement means which measures and computes the lens refraction characteristic distribution of a subject lens. In the case where the lens meter 1 is used as lens measurement means, the system shown in FIG. 1 serves as a lens specification unit, and the arithmetic control unit 101*a* of the computer 100 serves as a lens measurement unit.

Furthermore, a plurality of lens meters 1' in eyeglass stores 70 are connected to the RS-232C terminal 51*b* of the arithmetic control circuit 101*a* through personal computers (PCs) 72, modems 73, a telephone line 74, and a modem 75. Moreover, for the lens meters 1 and 1', the one shown in FIG. 8 is employed.

Lens Meter

The lens meters 1 and 1' will next be described in reference to FIGS. 8(A) through 29. The lens meters 1 and 1' are identical in structure with each other and therefore the lens meter 1 alone will be described.

Basic Structure of a Lens Meter

Figure 8A:
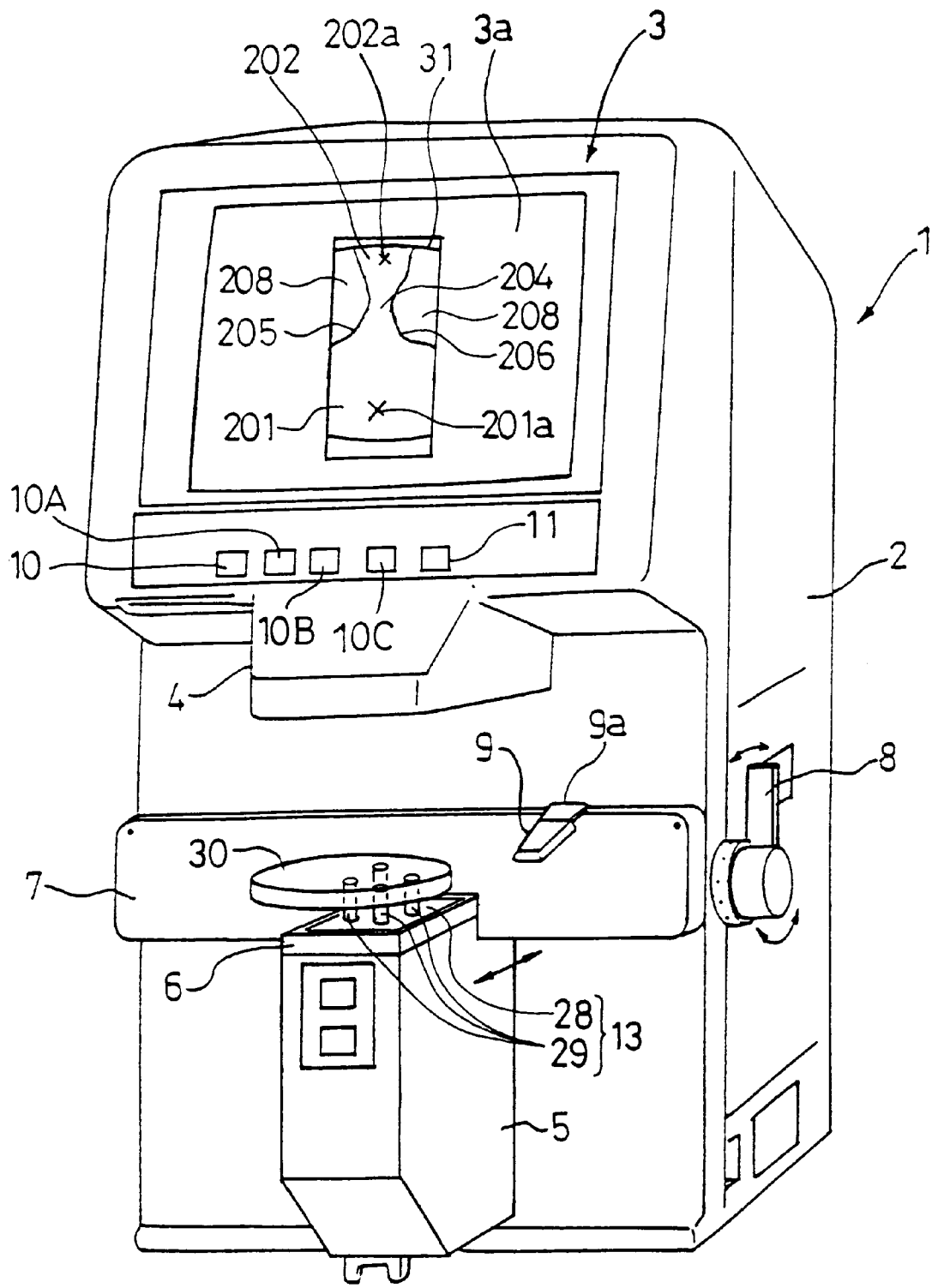
FIG. 8(A) is a perspective view of the lens meter shown in FIG. 1.
Figure 8B:
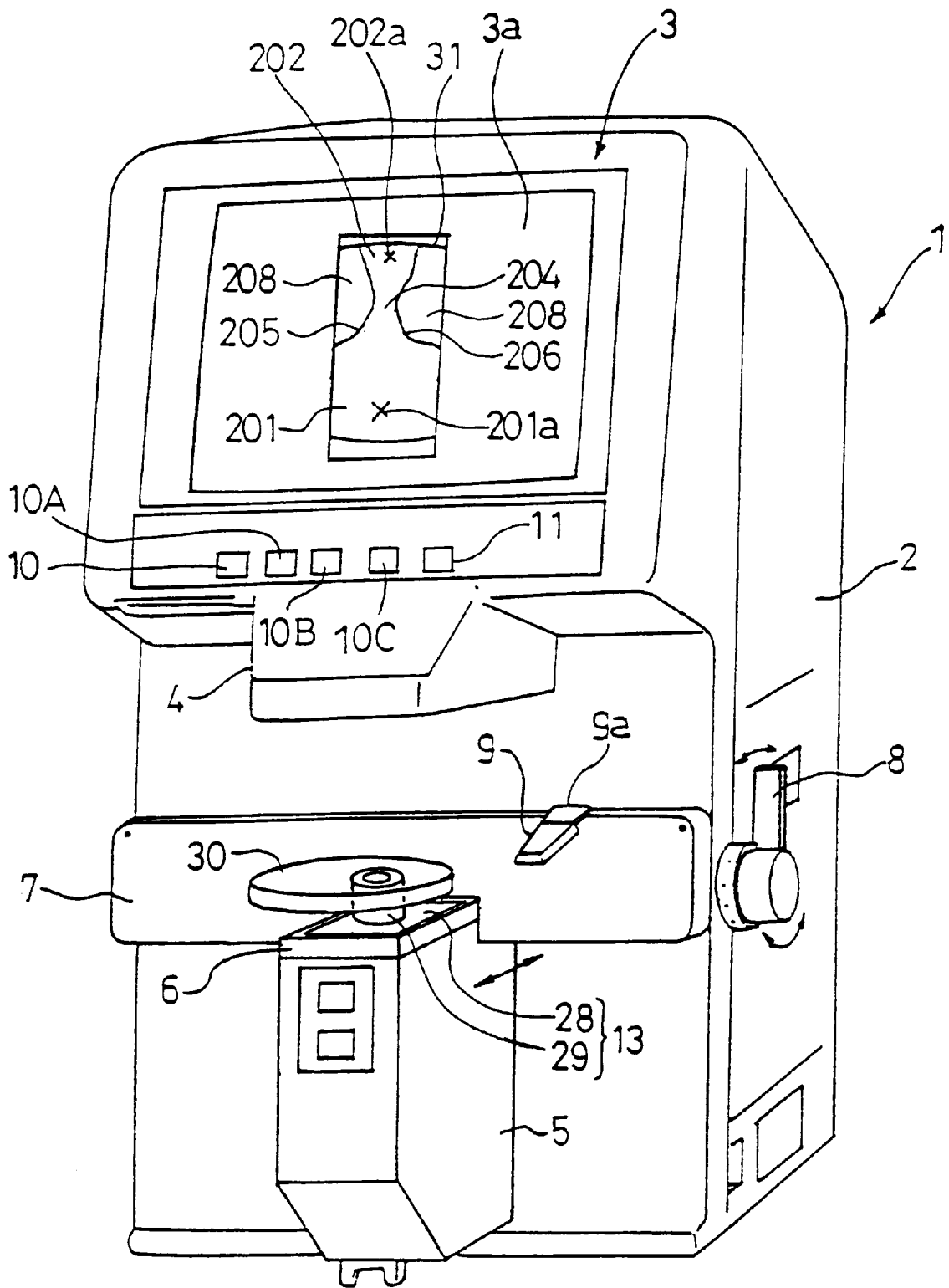
FIG. 8(B) is an explanatory diagram showing a modification of the lens receiver shown in FIG. 8(A)

In FIG. 8(A) reference numeral 1 denotes a lens meter. The lens meter 1 is constituted by a main body 2, a monitor 3, such as a CRT and a liquid crystal display, provided on the upper portion of the main body 2, a display screen (display means, i.e., notification means) 3*a* of the monitor 3, an upper optical-component housing portion 4 provided on the front side of the main body 2, and a lower optical-component housing portion 5 provided so as to be positioned under the upper optical-component housing portion 4. Furthermore, the lens meter 1 is constituted by a lens receiving table 6 provided on the upper end of the lower optical-component housing portion 5, a lens pad 7 interposed between the upper and lower housing portions 4 and 5 and held on the front surface of the main body 2 so as to be movable back and forth, and a control lever 8 held on the side of the main body 2 so as to be rotatable up and down. The back and forth movements of the lens pad 7 are adjusted by up and down rotations of the control lever 8.

Figure 25:
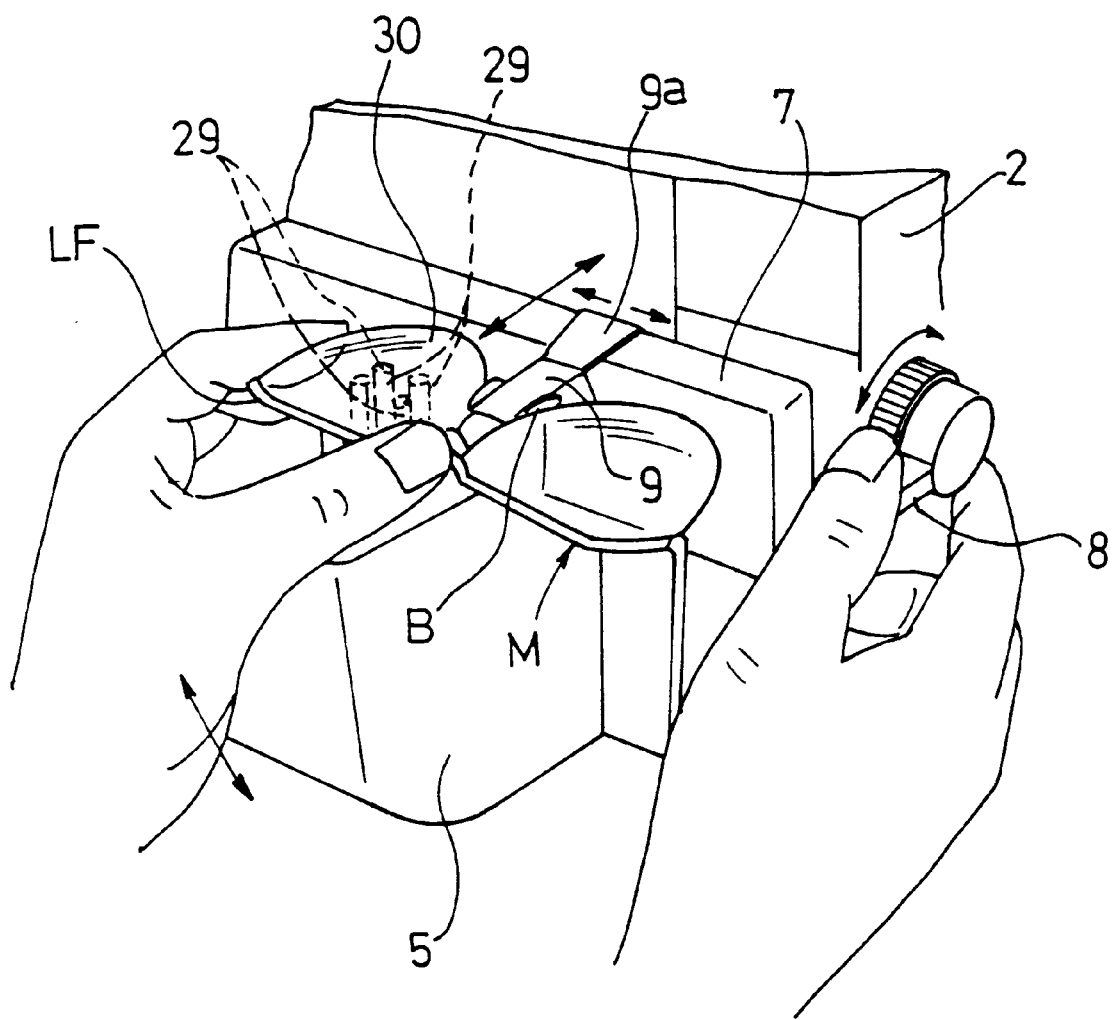
FIG. 25 is a perspective view showing how eyeglasses are set on the lens receiver.

On the upper end of the lens pad 7 a slider 9*a* is held so as to be freely movable right and left, and on this slider 9*a* a nose-pad support member 9 is held so as to be rotatable up and down. This nose-pad support member 9 is urged upward by a spring (not shown) and the upward rotation is regulated at a horizontal position. In the case where the refraction characteristic value of the subject lens SL (30) of eyeglasses M is measured by making use of this nose-pad support member 9, the nose pad B of the eyeglasses M is brought into contact with the nose-pad support member 9 from above, as shown in FIG. 25. Then, the nose-pad support member 9 is rotated downward and moved right and left so that the subject lens SL (30) abuts a lens receiver 13 to be described later. Reference numeral 10 denotes a change-over switch, reference numeral 10A denotes a menu switch (mode change-over switch) by which a menu used to change over a measurement mode, a display mode, and the like, is displayed on the display screen 3*a*, reference numeral 10B denotes a selection switch for selecting any one of functions listed in the menu, reference numeral 10*c* denotes a determination switch for determining a selected function of the menu, and reference numeral 11 denotes a measurement start switch.

Figure 9A:
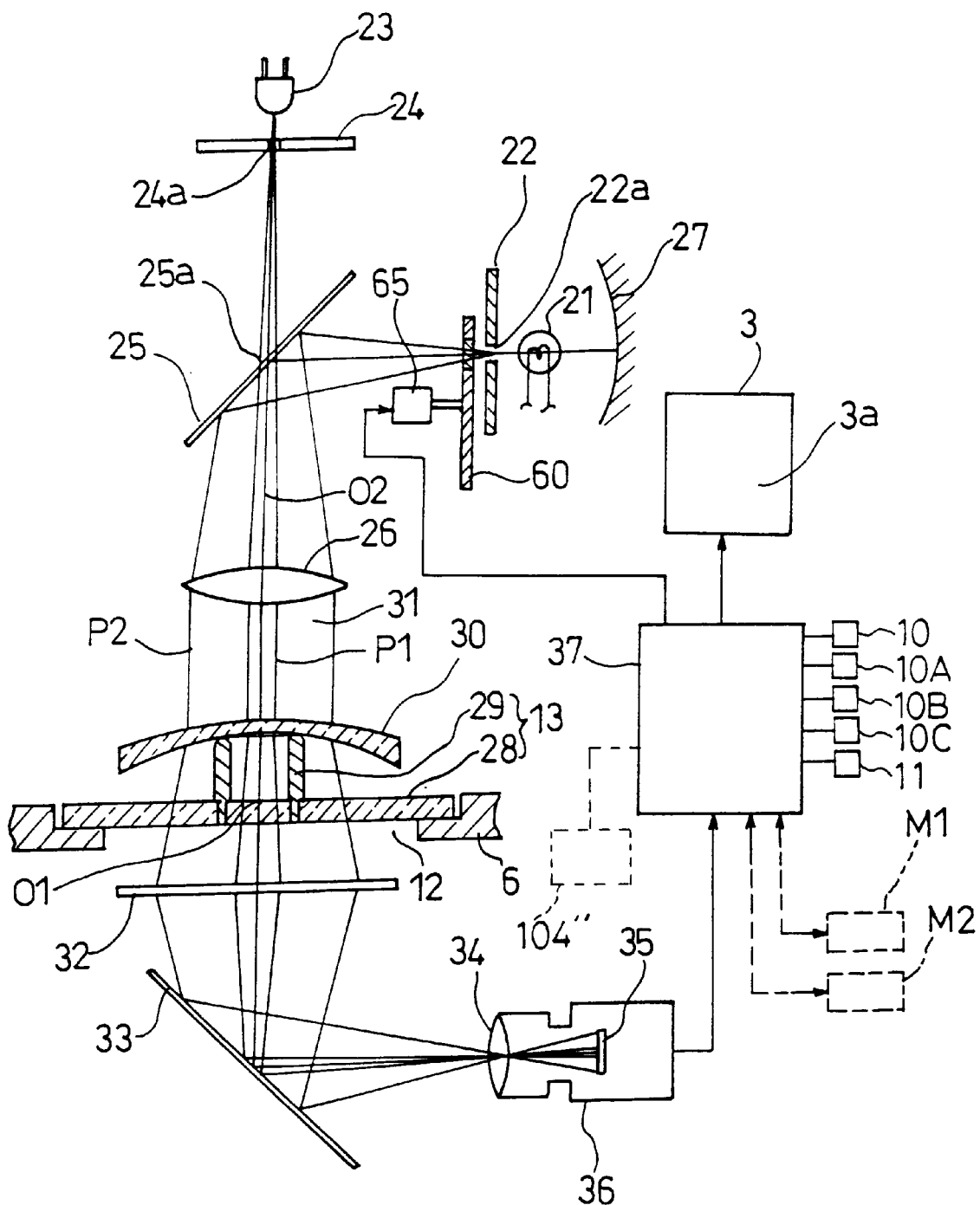
FIG. 9(A) is an optical diagram showing the lens meter of FIGS. 1 and 8.

The lens receiving table 6 is formed with a stepped attaching hole 12, as shown in FIG. 9(A), and a lens receiver 13 is provided in this attaching hole 12. A circular unprocessed lens, a processed lens, or an eyeglass lens framed in the eyeglass frame is set on the lens receiver 13.

A measuring optical system shown in FIG. 9(A) is provided within the main body 2. The measuring optical system includes a light source portion 20 and a light receiving optical system.

The light source portion 20 has a first light source 21 for generating a measuring light beam, a first pinhole plate 22 with a pinhole 22*a*, a filter disc 60 as a means of measuring spectral transmittance, a perforated mirror 25, and a collimator lens 26 in this order. The light source portion 20 further has a second light source 23 for generating a center position determining light beam (a position specifying light beam), a second pinhole plate 24 with a pinhole 24*a*, and an opening 25*a* of the perforated mirror 25. Reference numeral 27 denotes a beam-condensing concave mirror, which is provided behind the first light source 21.

The light receiving optical system includes the lens receiver 13, a screen 32, a mirror 33, and a CCD camera 36. The CCD camera 36 comprises an image forming lens 34 and an area CCD 35 (image-receiving portion).

The filter disc 60 may also be provided in front of the image forming lens 34. An LED, which is excellent in directivity, is used as the light source 23.

Figure 9B:
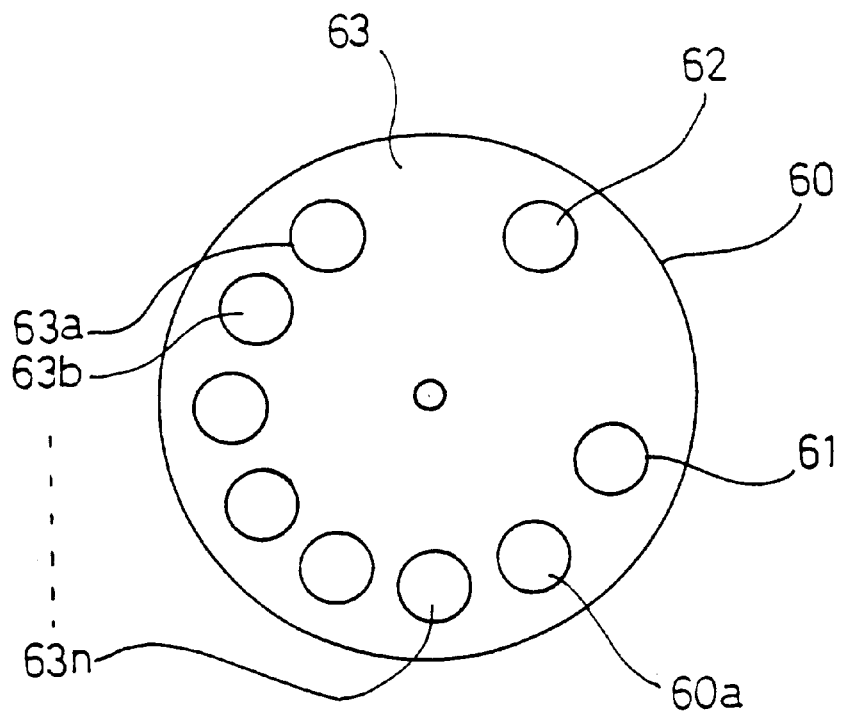
FIG. 9(B) is a plan view showing the filter disc of FIG. 9A.

The filter disc 60 is provided with a first filter portion 61 which transmits ultraviolet light UVA with a wavelength of 280 nm to 315 nm and also shuts out light of other wavelengths, a second filter portion 62 which transmits ultraviolet light UVB with a wavelength of 315 nm to 380 nm and also shuts out light of other wavelengths, a third filter portion 63 for obtaining the spectral transmittance of visible rays in a range of 380 nm to 800 nm, and a transmitting hole 60*a*. The third filter portion 63, as shown in FIG. 9(B), is provided with filter portions 63*a* through 63*n* which can select a transmitted wavelength in stages between 380 nm and 800 nm. The filter disc 60 constructed as described above is rotated by a drive motor (drive means) 65 such as a pulse motor. In the case where the mapping of refraction characteristics of the subject lens is performed or the refraction characteristics are measured to determine a spherical surface, an aspherical surface, or the like, the transmitting hole 60*a* of the filter disc 60 is caused to face the pinhole 22*a*. Additionally, in the case where the spectral transmittance of the subject lens is measured, any one of the filter portions 61, 62, 63*a*–63*n* is caused to face the pinhole 22*a* by turns.

The first light source 21 is constituted by a halogen lamp, which in turn emits light in a range between an ultraviolet ray and an infrared ray. The second light source 23 is constituted by a light-emitting diode (LED). The transmitting hole 60*a* of the filter disc 60 is disposed in an optical path so that the measuring light beam of all wavelengths from the first light source 21 is projected onto a subject lens.

The perforated mirror 25 is formed with an opening 25*a*. The first and second pinhole plates 22 and 24 are disposed at the focal positions of the collimator lens 26. The collimator lens 26 fulfills a role of converting the light beams emitted from the first and second light sources 21 and 23 to collimated light beams. In this embodiment, the light beam emitted by the first light source 21 is represented by reference character P1, and the light beam emitted by the second light source 23 is represented by reference character P2.

The lens receiver 13 is set in the lens receiving table 6. This lens receiver 13 is constituted by a patterning plate 28 and lens receiving pins 29. The patterning plate 28 is rectangular in shape as shown in FIG. 10 and is mounted in the lens receiving table 6 through the stepped attaching hole 12.

Figure 10:
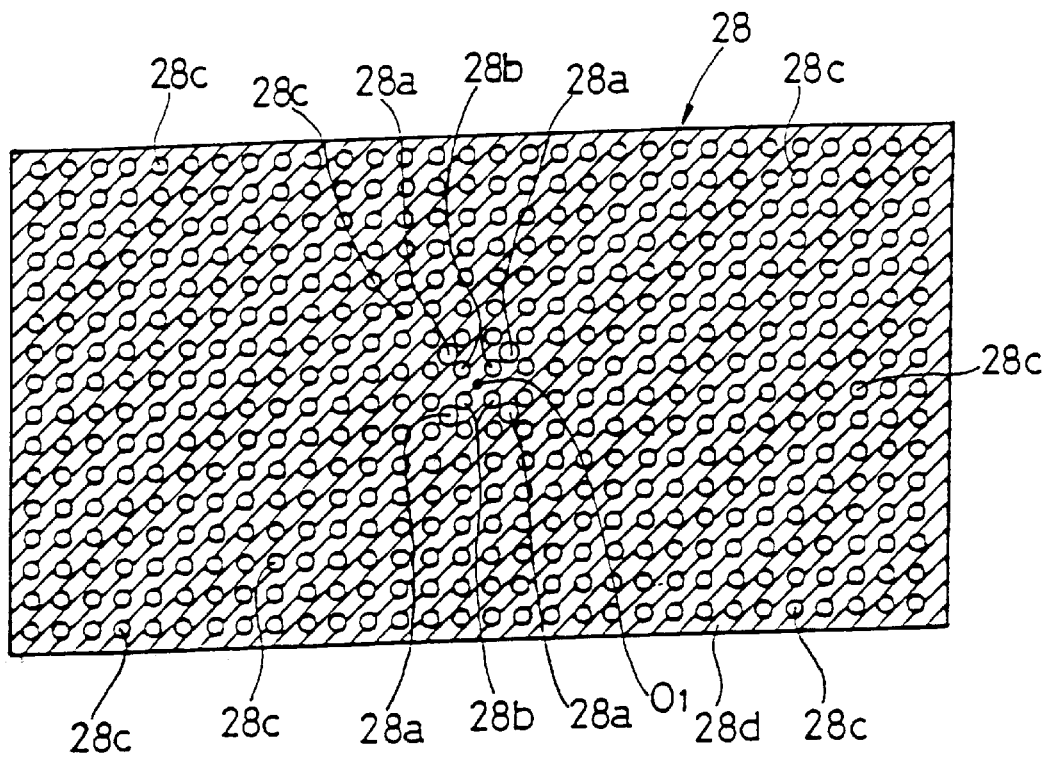
FIG. 10 is a plan view of the patterning plate shown in FIG. 8.
Figure 11:
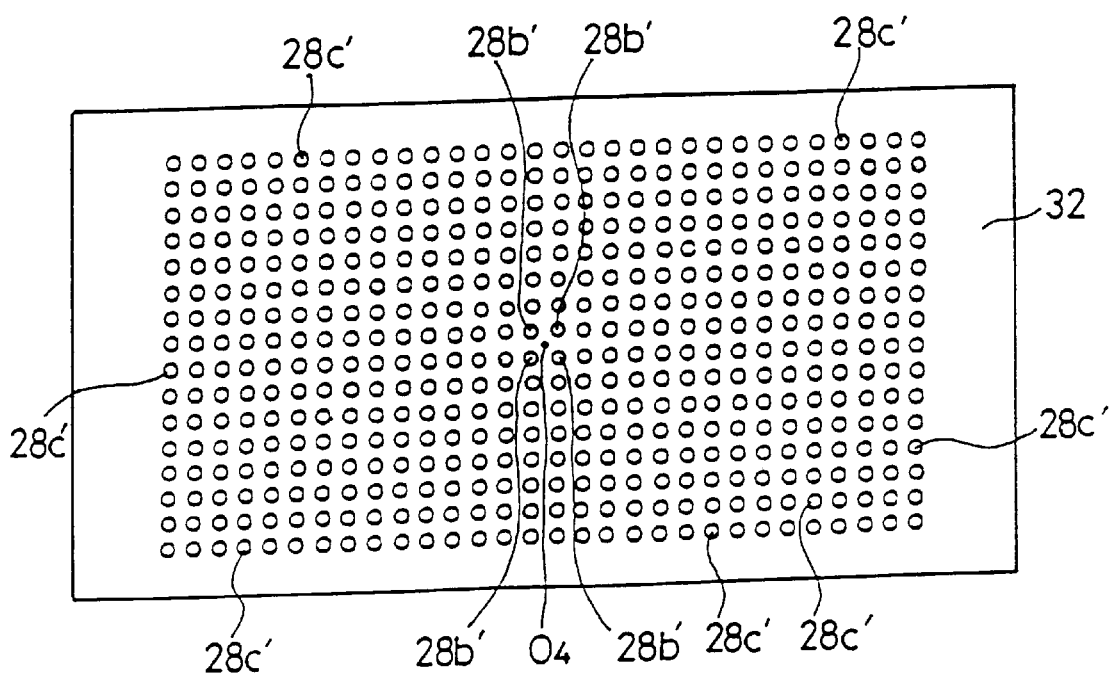
FIG. 11 is a plan view showing the pattern images projected on a screen when an eyeglass lens is not set in an optical path.

The patterning plate 28, as shown in FIG. 10, is formed with four circular lens-receiving-pin mounting grooves 28a around the center position O1 of the patterning plate 28 so that the lens receiving pins 29 can be detachably mounted in the circular grooves 28a. Four inner circular holes 28b are formed around the center position of the patterning plate 28 and inside the circular grooves 28a. Also, a plurality of outer circular holes 28c are formed outside the circular grooves 28a of the patterning plate 28. The four inner circular holes 28b are employed to determine the center position O4 of pattern images (see FIGS. 11 through 13 and FIGS. 15 and 16) corresponding to the center position O1 of the patterning plate 28. The outer circular holes 28c are employed to determine the lens characteristics of a subject lens 30. The inner circular holes 28b are identical in size (opening area) with the outer circular holes 28c.

The outer circular holes 28c are formed at regular intervals, and the total number of the circular holes 28c is approximately 1000. The remaining portion of the patterning plate 28 constitutes a light shielding portion 28d. The lens-characteristic measuring light beam P2 emitted from the light source 21 is reflected by the perforated mirror 25 and is projected nearly over the entire area of the patterning plate 28. The position specifying light beam P1 emitted from the light source 23 passes through the opening 25a of the mirror 25 and is projected onto the inner circular holes 28b disposed inside the circular grooves 28a. In the optical path 31 of the lens-characteristic measuring light beam P2, the screen 32 is provided under the pattern plate 28 and at a position of predetermined distance from the subject lens 30. This screen 32 consists, for example, of a diffusing plate. In FIG. 9(A), the projected inner pattern images 28b' on the screen 32 correspond to the inner circular holes 28b of the patterning plate 28, and the projected outer pattern images 28c' on the screen 32 correspond to the outer circular holes 28c of the patterning plate 28. Similarly, the projected image O4 on the screen 32 corresponds to the center position O1 of the patterning plate 28.

If the measuring optical system is used as the lens measuring means in this embodiment, a processing circuit 37 serves as lens judgment means, and the monitor 3 serves as notification means.

Operation in the first embodiment (i) Measurement of refraction characteristics and mapping thereof In the case where refraction characteristics of the subject lens are measured to determine a spherical or aspherical surface or perform mapping of the refraction characteristics, the change-over switch 10 is first operated, and a menu (not shown) is displayed on the display screen 3a by means of the processing circuit 37. After that, an item "Refraction characteristic measurement" is selected from items listed on the menu by operating the selection switch 10B, and is determined by the determination switch 10C. Thereafter, the processing circuit 37 actuates and controls the drive motor 65, and the transmitting hole 60a of the filter disc 60 is caused to face the pinhole 22a.

Additionally, according to this selection, the processing circuit 37 turns on the light sources 21 and 23. Thereby, the light beam P2 emitted from the light source 21 is reflected by the perforated mirror 25 and is projected nearly over the entire area of the patterning plate 28, whereas the light beam P1 emitted from the light source 23 passes through the opening 25a of the mirror 25 and is projected onto the inner circular holes 28b disposed inside the circular grooves 28a.

In this case, when the subject lens 30 has not been set in the optical path 31, the light beams P1 and P2, as they are collimated light beams, are guided to the patterning plate 28 and transmitted through the circular holes 28b and 28c formed in the patterning plate 28. Consequently, based on the transmitted light beams P1 and P2, pattern images corresponding to the patterning plate 28 are projected onto the screen 32, as shown in FIG. 9(A).

Suppose that an unprocessed lens with negative power has been set as a subject lens 30 on the lens receiver 13 in FIG. 9(A).

If the subject lens 30 is set in the optical path 31 as in FIG. 9(A), then the light beams P1 and P2 will be projected onto the subject lens 30. The light beams P1 and P2 are subjected to deformation by the negative power of the subject lens 30 and are diffused. Consequently, as shown in FIG. 12, the spacing between the projected pattern images on the screen 32 becomes wider than that between the projected pattern images (FIG. 11) which are obtained when no subject lens is set in the optical path 31.

Figure 13:
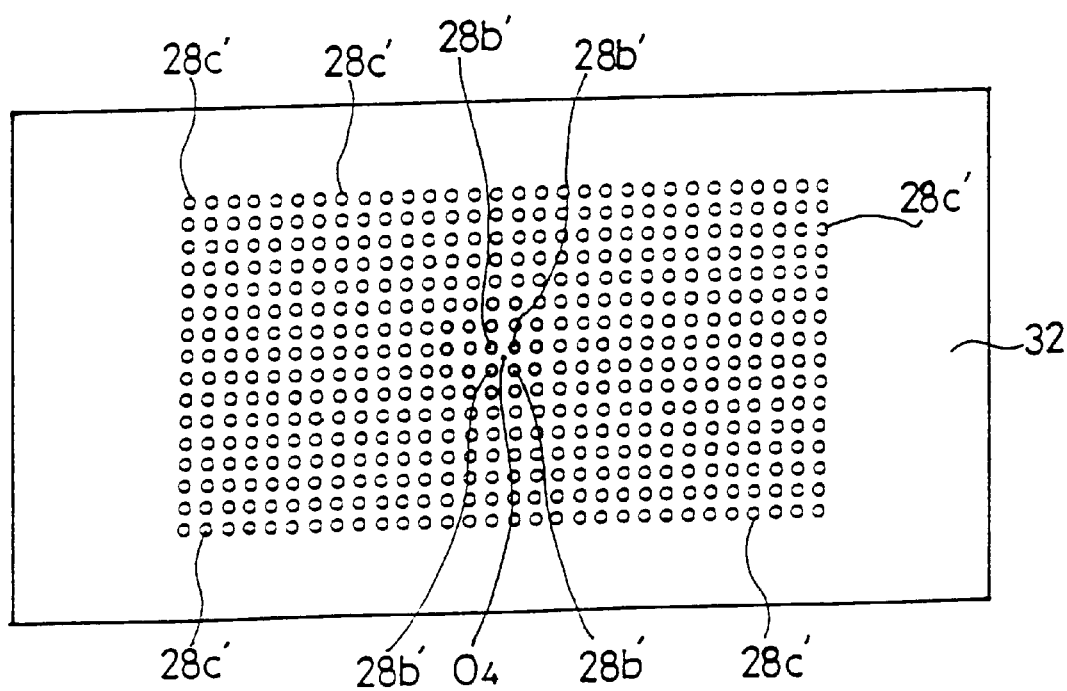
FIG. 13 is a plan view showing an example of the pattern images projected on a screen when an eyeglass lens with positive power is not set in the optical path.
Figure 14:
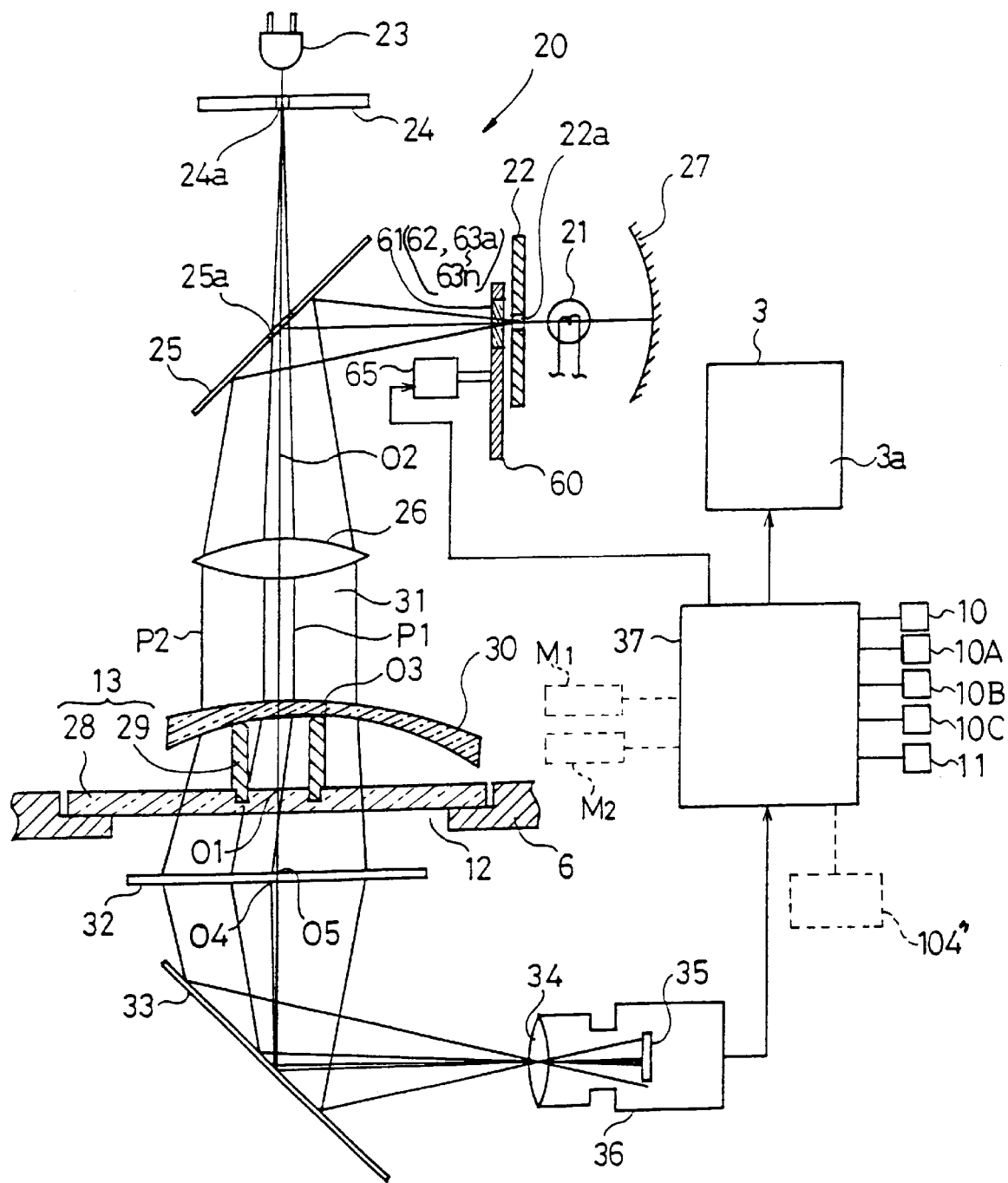
FIG. 14 is an optical diagram showing the lens meter of FIGS. 1 and 8, a subject lens being offset from the optical axis of the optical path.

If a subject lens with positive power (not shown) is set in the optical path 31, the light beams P1 and P2 will be subjected to deformation by the positive power of the subject lens and will be converged. As a consequence, as shown in FIG. 13, the spacing between the projected pattern images on the screen 32 becomes narrower than that between the projected pattern images (FIG. 11) which are obtained when no subject lens is set in the optical path 31. By obtaining the spacing between the projected pattern images at each point on the screen 32, the lens characteristics of the subject lens 30 (e.g., degree distribution) can be obtained.

Figure 12:
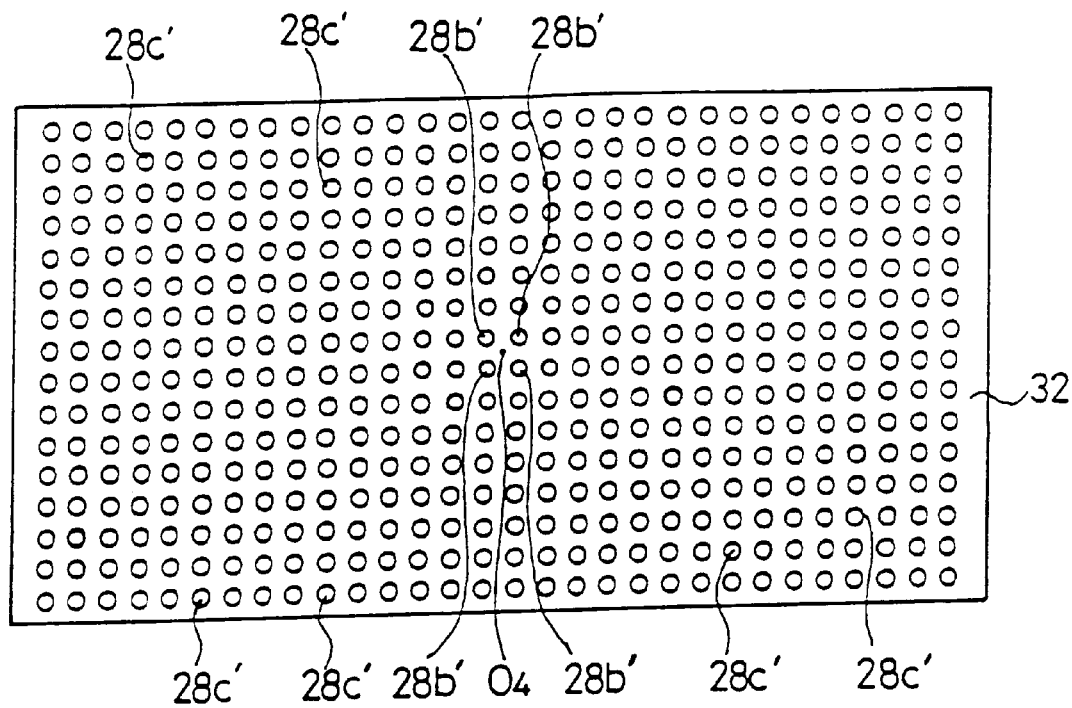
FIG. 12 is a plan view showing an example of the pattern images projected on a screen when an eyeglass lens with negative power is not set in the optical path.

Notice in FIGS. 12 and 13 that the projected pattern images have been shown on the assumption that the optical axis O3 of the subject lens 30 and the optical axis O2 of the optical path 31 are coincident with each other.

In the optical path 31 there is provided the reflecting mirror 33 behind the screen 32. In the reflected optical path of the reflecting mirror 33 the charge-coupled device (CCD) camera 36 is provided, and the CCD camera 36 comprises the image forming lens 34 and the area CCD 35. The area CCD 35 is provided at a position which is conjugate with the screen 32 with respect to the image forming lens 34, and consequently, the pattern images projected on the screen 32 are projected onto the area CCD 35.

The area CCD 35 is connected to the processing circuit 37. This processing circuit 37 performs at least a determination process and an analysis process. In the determination process, the center position O4 of the projected pattern images on the screen 32 corresponding to the center position O1 of the patterning plate 28 is determined based on the position specifying light beam P1. In the analysis process, the lens characteristics of the subject lens 30 are analyzed based on the lens-characteristic measuring light beam P2. To the processing circuit 37 a change-over switch 10 is connected. In this embodiment, the processing circuit 37 is switched between the determination process and the analysis process by the change-over switch 10.

Figure 15:
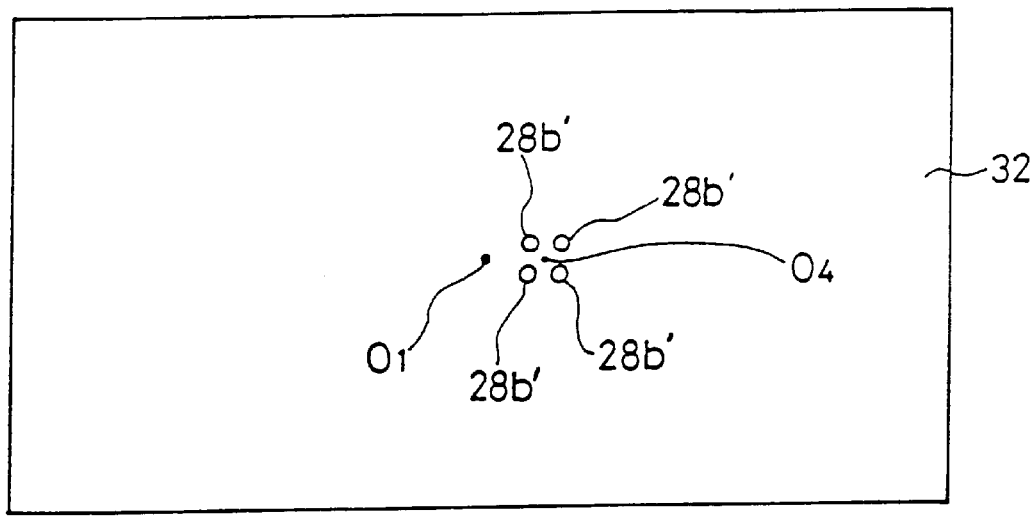
FIG. 15 is a plan view showing the state where only the images of center-position determining patterns have been projected on the screen shown in FIG. 9(A)
Figure 16:
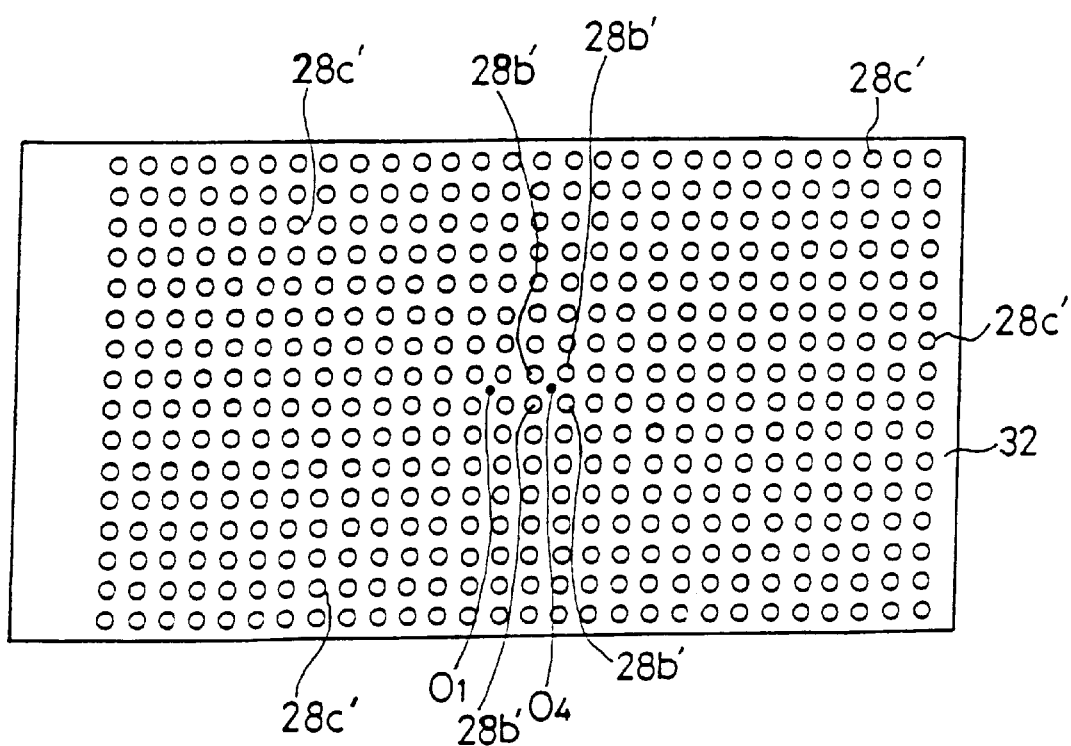
FIG. 16 is a plan view showing the state where the images of center-position determining patterns and the images of lens-characteristic measuring patterns have been projected on the screen.

For example, if the change-over switch 10 is turned on with the measurement start switch 11 turned off, the second light source 23 alone will be lit and the first light source 21 will remain turned off. When the optical axis O3 of the subject lens 30 is offset from the optical axis O2 of the optical path 31, the position specifying light beam P1 is deflected as shown in FIG. 9(A) by the subject lens 30 and the inner holes 28b of the patterning plate 28 are projected as four images 28b' on an area deflected from the center position O5 of the screen 32. As shown in FIG. 15, if the center position O4 of the four projected images 28b' is detected, the center position O4 can be determined when the subject lens 30 is offset from the optical axis of the optical path 31. Next, if the measurement start switch 11 is turned on, the first light source 21 will be lit along with the second light source 23. As a consequence, the outer pattern images 28c' are obtained on the screen 32 along with the inner pattern images 28b', as shown in FIG. 16. The center position O4 of the inner pattern images 28b' has already been obtained, and therefore, if a degree distribution analysis process is performed by the processing circuit 37, the lens characteristics of the subject lens 30 will be obtained. At this time, the processing circuit 37 functions as a means for specifying the position of a position specifying pattern image.

According to the first embodiment of the present invention, the center position O4 of the projected images on the screen 32 can be determined based on the four projected images 28b', so the specification of the center position O4 can be quickly performed.

In the first embodiment of the present invention, while the position specifying light beam P1 has been projected on the patterning plate 28 by employing the perforated mirror 25, the present invention can also be constructed so that the wavelength of the position specifying light beam P1 and the wavelength of the lens-characteristic measuring light beam P2 differ from each other and so that the position specifying light beam P1 alone is transmitted through an area corresponding to the opening 25a of the perforated mirror 25 and also the lens-characteristic measuring light beam P2 is reflected.

In the first embodiment of the present invention, although the first light source 21 has been turned off and the second light source 23 alone has been turned on to obtain the center position O4 of the projected pattern images on the screen 32, the center position O4 can also be obtained with the first and second light sources 21, 23 turned on.

In this case, for example, the light quantity of the first light source 21 and the light quantity of the second light source 23, are previously set so that the luminance brightness of the projected inner images 28b' on the screen 32 becomes greater than that of the projected outer images 28c'. If the light quantity of the first light source 21 and the light quantity of the second light source 23 are set like this, the light quantity Q1 based on the projected inner images 28b' can be made greater than the light quantity Q2 based on the projected outer images 28c'. Therefore, if slice levels Sr1 and Sr2 are set by the processing circuit 37, the projected inner images 28b' and the projected outer images 28c' can be discriminated from each other. Also, if the center position O4 of the projected images on the screen 32 is specified by the slice level Sr1 and if the position of the projected outer images 28c' is detected by the slice level Sr2, likewise the center position O4 of the pattern images can be quickly specified.

According to this modification, the first light source 21 can be kept on at all times. In the case where a halogen lamp is employed as the first lamp 21, if the halogen lamp is repeatedly turned on and off, the filament degradation in the halogen lamp will be accelerated and the life of the halogen lamp will be shortened. However, in this modification, shortening of halogen lamp life can be suppressed.

Note that the lighting voltage of the halogen lamp may be reduced in a range which can maintain a halogen cycle in order to reduce the luminance brightness of the halogen lamp. Also, the halogen lamp is caused to be always in a light-on state, and the false light-out state of the halogen lamp can be created by a mechanical shutter. However, in this case the structure becomes complicated compared with the aforementioned modification.

Figure 17:
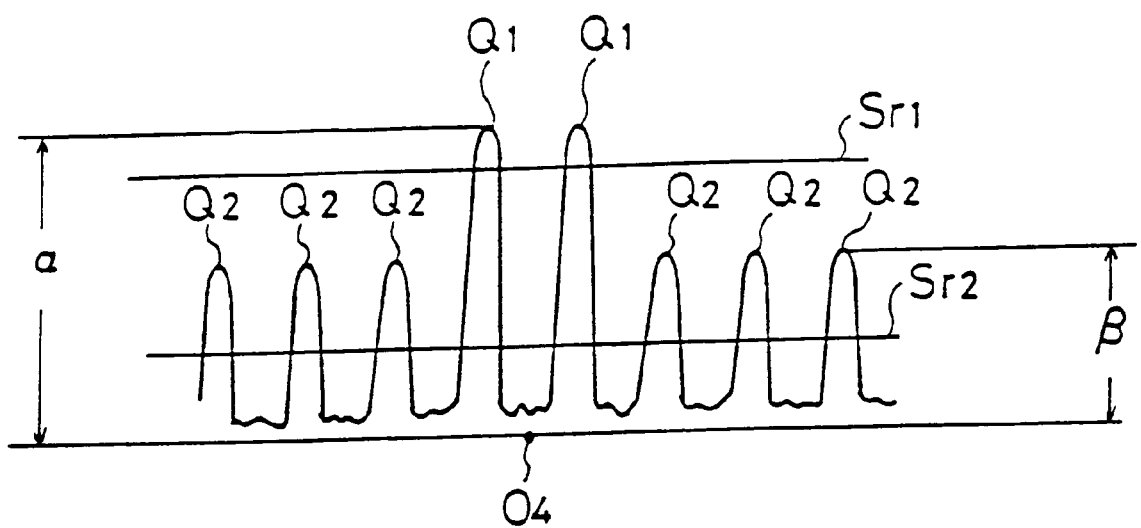
FIG. 17 is a diagram showing a light quantity distribution based on the pattern images shown in FIG. 16.

In the case where the light quantity of the light beam of the second light source 23 is sufficiently large, even if the first and second light sources 21 and 23 are not separate light sources, the light quantity distribution of images shown in FIG. 17 will likewise be obtainable if the transmittance of the inner circular holes 28b of the patterning plate 28 is made greater than that of the outer circular holes 28c. Even in this case, the center position O4 of the projected inner images 28c on the screen 32 can be specified.

According to the aforementioned structure, a subject lens framed in the eyeglass frame can also be measured. FIGS. 18 through 23(A) show an example of the case where a framed subject lens is measured.

Figure 18:
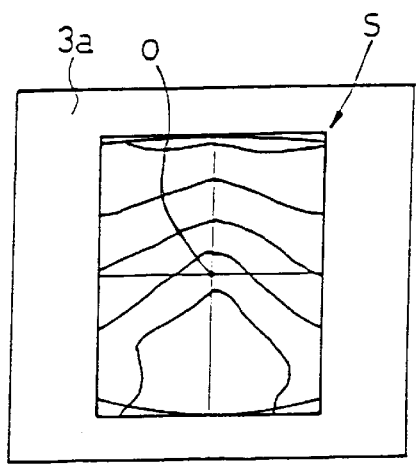
FIG. 18 is a diagram showing an example of the mapping display of the lens characteristic value of an eyeglass lens, a spherical degree distribution being shown.
Figure 19:
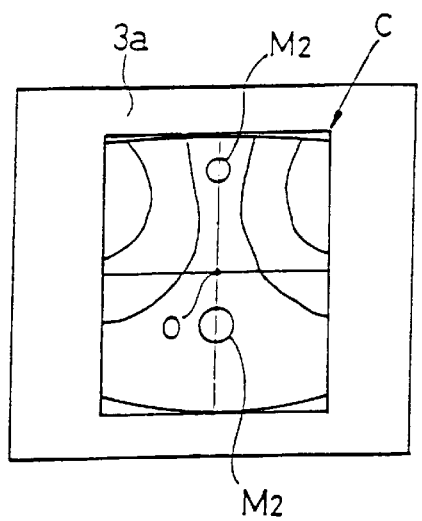
FIG. 19 is a diagram similar to FIG. 18 showing a cylindrical degree distribution.
Figure 20:
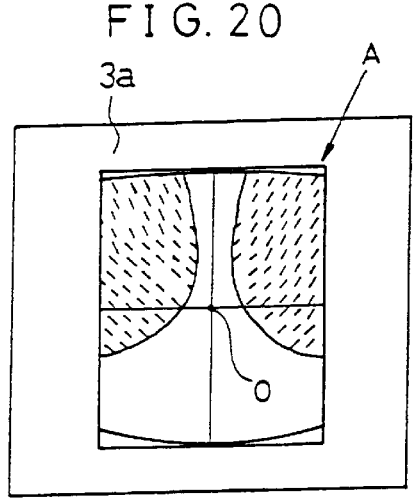
FIG. 20 is a diagram similar to FIG. 18 showing an axial angle distribution.
Figure 21:
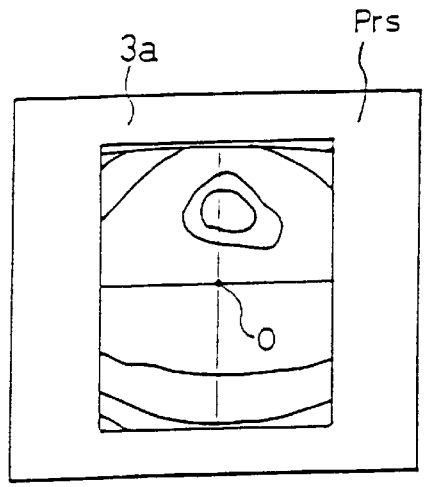
FIG. 21 is a diagram similar to FIG. 18 showing a prism degree distribution.

The projected image is rectangular in shape in correspondence with the configuration of the patterning plate 28. FIG. 18 shows a spherical degree S, FIG. 19 a cylindrical degree C, FIG. 20 an axial angle A, and FIG. 21 a prism degree Prs.

Figure 23A:
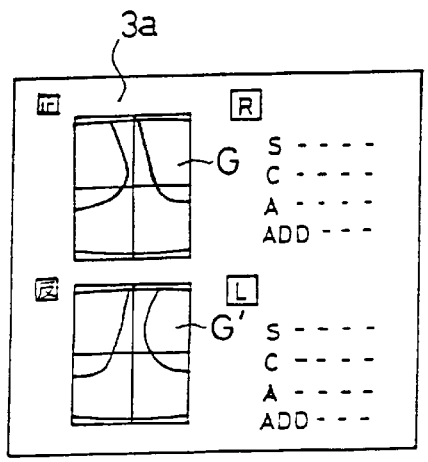
FIG. 23(A) is a view similar to FIG. 18 showing the cylindrical degree distributions and measured values of an eyeglass lens for a left eye and an eyeglass lens for a right eye, one image having been inverted with respect to the other.

As shown in FIG. 11(e), for example, the measured numerical values of the spherical degree S, cylindrical degree C, axial angle A, and prism degree Prs can also be displayed at the same time in parallel with the mapping display of the cylindrical degree C. Furthermore, as shown in FIG. 23(A), it is also possible to display the image of an eyeglass lens for a left eye (L) and the image of an eyeglass lens for a right eye (R) at the same time, and in addition, one image can be invertedly displayed in correspondence with the other. If displayed like this, it is easy to know the layout of a subject lens in the state where the subject lens has been framed in the eyeglass frame.

Figure 22:
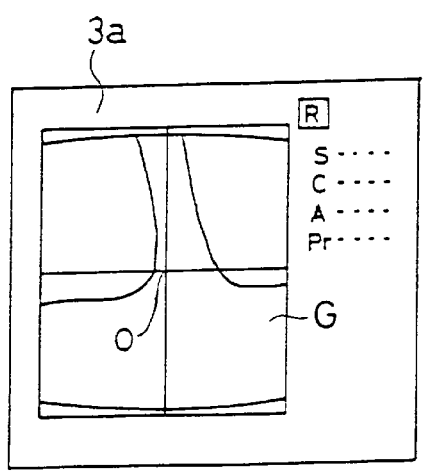
FIG. 22 is a diagram similar to FIG. 18 showing measured values along with the cylindrical degree distribution.

That is, the processing circuit 37 can display an image G in a "normal" state and an inverted image G' on the screen 3a, shown in FIG. 23(A). The inverted image G' is obtained by performing a data process on the image G obtained by measurement, as shown in FIG. 22. In addition, the refraction characteristic values S, C, and A of the right and left eyeglass lenses R and L, that is, the spherical degree S, cylindrical degree C, cylindrical axial angle A, and the added degree ADD can be displayed at the same time.

Such display is advantageous in the case where either the right eyeglass lens or the left eyeglass lens is damaged and therefore the damaged eyeglass lens is replaced with a new lens. In this case, the refraction characteristics of the undamaged eyeglass lens R or L are first measured. Then, the measured refraction characteristics of the undamaged eyeglass lens R or L (R for this embodiment) and one of the refraction characteristic images G and G' are displayed on the portions R and L shown in FIG. 23(A). At this time, the maker and the product number are retrieved and specified from the obtained data, and an unprocessed lens for the other eyeglass lens is selected. The refraction characteristics of the selected unprocessed lens are measured in the same way as the aforementioned. The refraction characteristic image obtained by this measurement is inverted and displayed on the screen 3a. At this time, the inclination direction of the progressive portion of the unprocessed lens is displayed in the same direction as that of the progressive portion of the refraction characteristic image of the undamaged eyeglass lens so that it can easily be judged whether or not the directions in which the progressive portions of the right and left eyeglass lenses extend (inclination of the progressive portion), that is, the inclination of each line linking the far point measuring portion and the near point measuring portion together is appropriate (whether or not they are balanced with each other).

Also, as previously described, when either one or the other of right and left eyeglass lenses is damaged, the refraction characteristics of the undamaged eyeglass lens R or L are measured. On the portions R and L shown in FIG. 23(A), one refraction characteristic R or L and one of the refraction characteristic images G and G' are displayed, and the other refraction characteristic and refraction characteristic image are inverted by image processing and are displayed on the screen 3a. Based on the data obtained by the inverting process, the maker and the product number can be retrieved and specified, and the obtained data can be used as data of the inclination of the progressive portion in retrieving and processing. The refraction characteristics of the eyeglass lens, processed based on the obtained data, are measured before it is framed in the eyeglass frame or after it is framed. If the measured refraction characteristic value and refraction characteristic image are displayed on the screen 3a and also the refraction characteristic value and refraction characteristic image of an undamaged eyeglass lens are displayed, it can easily be judged whether or not the directions in which the progressive portions of the right and left eyeglass lenses extend (inclination of the progressive portion), that is, the inclination of each line linking the far point measuring portion and the near point measuring portion together is appropriate (whether or not they are balanced with each other).

Figure 23B:
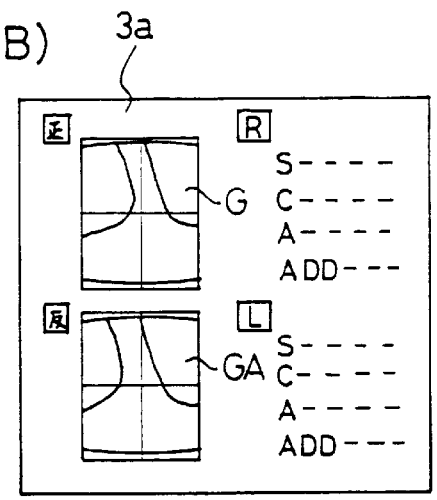
FIG. 23(B) is a view similar to FIG. 23(A) showing the cylindrical degree distributions and measured values of an eyeglass lens for a left eye and an eyeglass lens for a right eye, the refraction characteristic image of an undamaged eyeglass lens being displayed on one display portion of the cylindrical degree distributions and the refraction characteristic image of a subject lens selected based on a prescription being displayed on the other display portion.
Figure 23C:
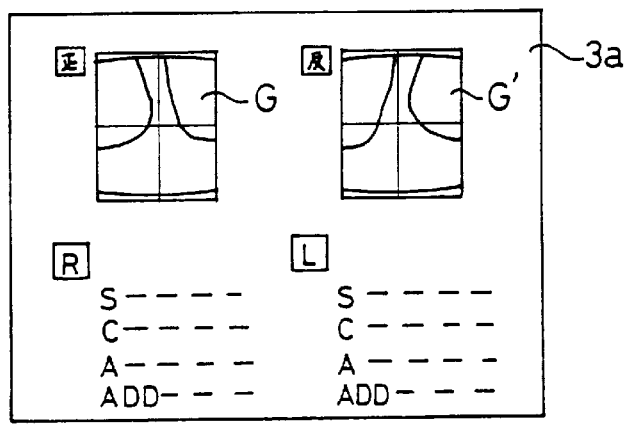
FIG. 23(C) is an explanatory diagram showing an example of the case where the up-and-down display of FIG. 23(A) has been changed to right-and-left display.
Figure 23D:
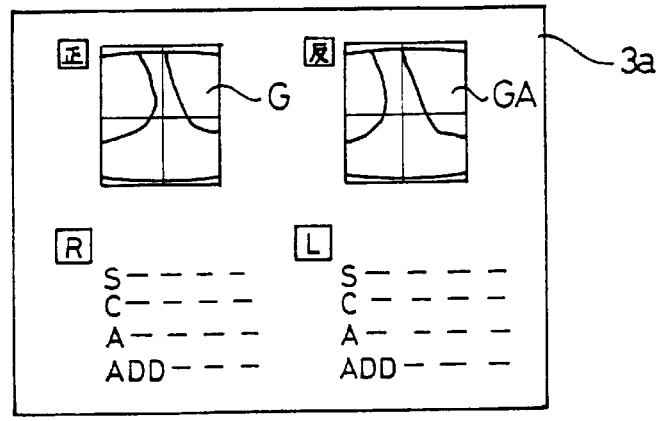
FIG. 23(D) is an explanatory diagram showing an example of the case where the up-and-down display of FIG. 23(B) has been changed to right-and-left display.

For example, when the left eyeglass lens is damaged, the refraction characteristics of the undamaged right eyeglass lens are measured. The refraction characteristic image G obtained by this measurement is displayed on the "R" on the screen 3a, and the refraction characteristics of the right eyeglass lens, selected based on a prescription, are measured. The refraction characteristic image based on this measurement is inverted by the processing circuit 37. The inverted refraction characteristic image GA may be displayed on the "L" portion, as shown in FIG. 23(B). For the up-and-down display of "R" and "L" shown in FIGS. 23(A) and 23(B), R and L may be displayed in parallel as shown in FIGS. 23(C) and 23(D). In this case, since such display becomes the same as an actual eyeglass lens layout, judgment can be more easily performed.

In FIG. 23(A), while the image G in a "normal" state and the image G' in an "inverted" state have been displayed up and down, they may be displayed right and left on the screen 3a to obtain a more actual eyeglass lens layout. In such a case, it can be more easily confirmed whether or not the inclination of the progressive portion of the lens is proper.

Also, for example, the refraction characteristics of a subject lens polished and processed into a left lens shape and a subject lens polished and processed into a right lens shape may be measured, respectively. Based on this measurement, the refraction characteristics of the right and left subject lenses may be displayed on the "L" and "R" portions of the screen 3a, as shown in FIG. 23(A), and the refraction characteristic image G of the subject lens "L" and the refraction characteristic image G' of the subject lens "R" may be displayed on the "normal" and "inverted" labeled portions of the screen 3a, respectively. In this case, it can easily be judged whether or not the direction in which the progressive portion 204 of each of the right and left eyeglass lenses extend (inclination of the progressive portion), that is, the inclination of the line linking the far point portion 101a and the near point portion 202a together is proper.

Furthermore, according to the display of FIG. 23(A), when the refraction characteristics of customer's eyeglasses having a progressive portion are measured, the comparison of the refraction characteristic images of the right and left eyeglass lenses becomes easy because the refraction characteristic images can be displayed right and left. In this case, since the refraction characteristic images of the right and left eyeglass lenses are images as they are measured, they are displayed in correspondence with the L "normal" and R "normal" portions displayed on the screen, and the refraction characteristic values of the right and left eyeglass lenses are displayed under the right and left images.

Figure 24:
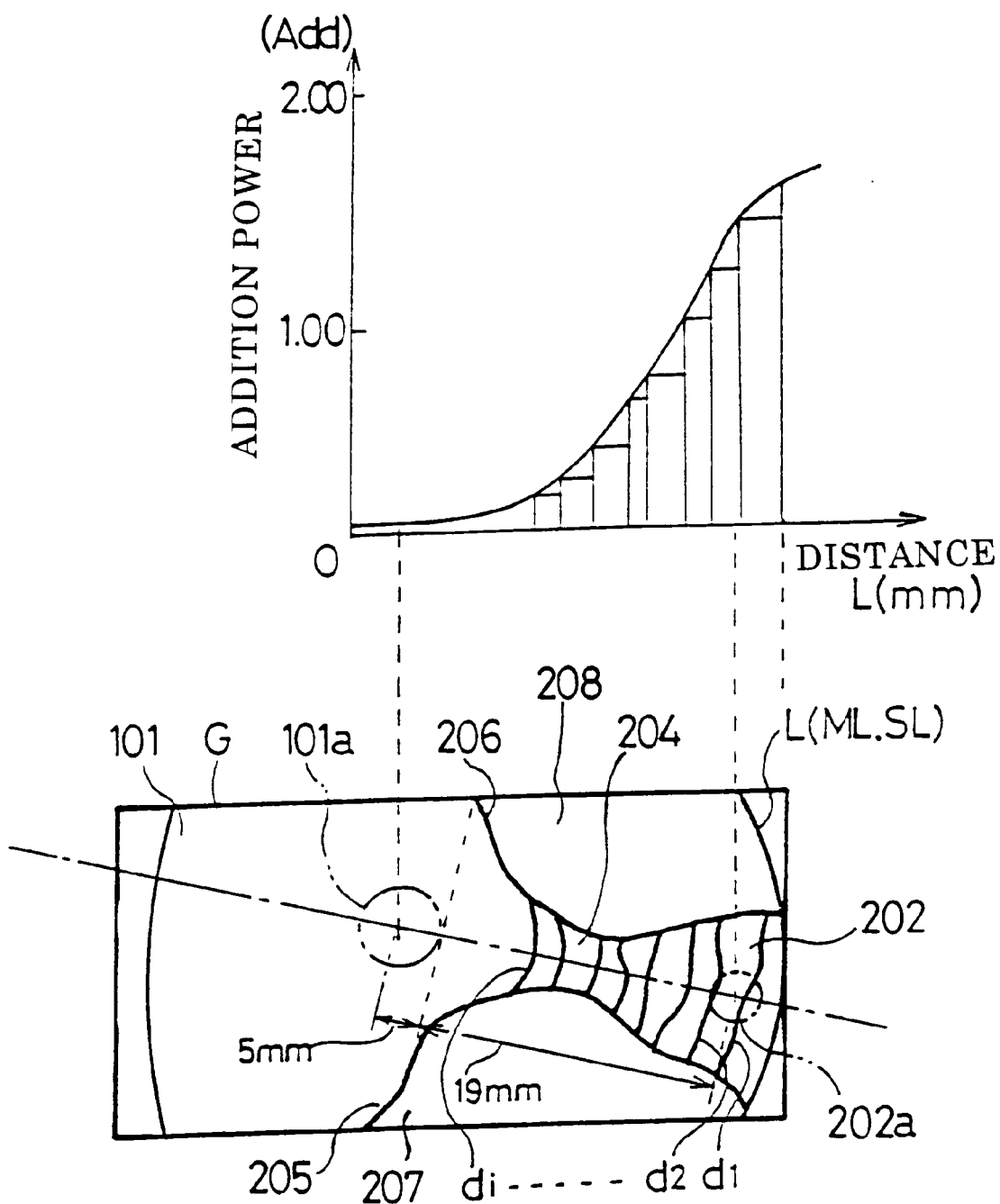
FIG. 24 is an explanatory diagram of the added degree of an eyeglass lens.

In this case, as shown in FIG. 24, there is provided a mode in which the constant degree lines d1 through di of the spherical refraction characteristic values (spherical refraction degrees) of FIG. 18 and the constant degree lines 205 and 206 with a cylindrical refraction value of 0.25 are displayed on the screen 3a of the display unit 3 and in which the added degree of the progressive portion 204 extending from the far point portion and the added degree of the near point portion are displayed on the screen 3a in parallel with the constant degree lines. The added degree is referred to as a value of the diopter (reciprocal of focal length) of the far point portion subtracted from the diopter of the progressive portion. In this case, the positions of the far point portion 201 and the progressive portion 204 and the spherical degree changes can be even more easily known. The image display switching operations such as those shown in FIGS. 18 through 24 can be implemented by controlling the mode changeover switch 210.

Example of Specification of a Subject Lens based on Refraction Characteristics (a) After the constant degree lines of the subject lens 30 have been obtained in the aforementioned way as shown in FIGS. 3 through 7 and FIGS. 22 through 24 by the processing circuit 37, the aforementioned PC 72 is connected to the computer 100 through the modem 73, telephone line 74, and the modem 75 so that the lens information recorded by the information recording/regeneration 104 can be retrieved. In this condition, the constant degree line information of the subject lens 30 obtained by the lens meter 1', that is, the refractive power distribution data is transferred to the arithmetic control circuit 101a of the computer 100 and is compared by the arithmetic control circuit 101a with a large amount of lens information recorded on the information recording/regeneration unit 104.

In the comparison, the arithmetic control circuit 101a specifies the lens information nearest to the measured data and then obtains the maker and model type from the specified lens information. This information is returned to the PC 72 in the eyeglass store 70 through the aforementioned telephone line. With this operation, in the eyeglass store 70 the maker and model type of the subject lens 30 can be known from the PC 72.

In the case where the eyeglass store 70 has not handled the same maker as the subject lens 30 measured in the aforementioned way, or in the case where a customer desires to have lenses made by a maker other than the measured maker, the list of makers and model types having lenses with data similar to the measured subject lens 30 can be displayed by controlling the PC 72 in the eyeglass store 70. In addition, a diagram showing the refractive power distribution of a desired lens can be displayed or it can be employed as a description to customers.

In the case where the lens usage type of the subject lens 30 is unknown, the arithmetic control circuit 101a is switched to the lens usage type measurement mode by controlling the measurement mode changeover switch 105. In this case, the refractive power information of the subject lens 30 is input to the arithmetic control circuit 101a with the input means 103, and the refraction characteristics of the subject lens 30 are measured as described above. With this measurement, the arithmetic control circuit 101a judges which type the measured subject lens 30 is among a sport type, a driving type, and an indoor type (far-near type, intermediate near type, near point type, etc.), from the input refractive power information and the measured refraction characteristics. The judged type is displayed on the TV monitor 102.

(b) If eyeglasses are used over a long term, the number of cases will not be few where the lens degree will not fit to the person wearing the eyeglasses. In such cases, surroundings will be difficult to see with currently used eyeglasses.

Even in a case such as this, the refraction characteristics of the eyeglasses currently being used are measured by the lens meter 1' in the same aforementioned way as new eyeglasses are made in the eyeglass store 70, and this measurement result is input to the arithmetic control circuit 101a by communication.

On the other hand, in the eyeglass store 70, the refractive powers of eyes are measured by an ophthalmic unit (ophthalmic data input means) such as an ophthalmometer and a refractometer, and this measurement result is input directly to the arithmetic control circuit 101a. Alternatively, the data of a prescription based on the measurement result, for example, data of a prescription describing lens data of a lens degree weaker than an actual lens degree is input to the PC 72 through a keyboard (not shown), and this data is input to the arithmetic control circuit 101a in the aforementioned way by communication.

In addition to this, the lens usage purpose (i.e., place where new eyeglasses are used), for example, a reading purpose (indoor purpose). a sport purpose, or a driving purpose is input to the PC 72 through usage purpose input means such as a keyboard, and the lens usage purpose is input to the arithmetic control circuit 101a by communication.

Based on the input usage purpose, the arithmetic control circuit 101a as comparison means computes the refractive degree of the usage purpose from the current refraction characteristic data of eyes, or computes the refractive degree corresponding to the usage purpose from the refractive degree based on a prescription. In the case where the refractive degree of a prescription has previously been determined according to usage purposes, the refractive degree of a prescription is computed. For example, in the case where an actually measured far-point degree (degree fitting to a point at infinity) and near-point degree are:

"For a far point:–5D
Added degree:+3D,"

the refractive degrees which are obtained from the measured refractive degrees in correspondence with a usage purpose will be the following (i) through (iii).

(i) Far-point importance type (for driving and sports)

If the usage purpose input to the arithmetic control circuit 101a is a driving purpose, the aforementioned values themselves will be the refractive degrees for a driving purpose.

That is, if the input usage purpose is a driving purpose, there will be no problem. Therefore, the arithmetic control circuit 101a regards the measured degree as:

"For a far point:–5D
Added degree:+2.5D"

In this way, refractive degrees for driving are obtained.

Figure 26:
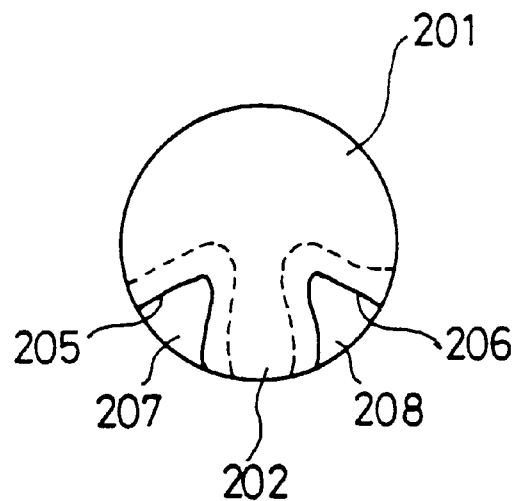
FIG. 26 is an explanatory diagram of another example of the lens refraction characteristics.
Figure 27:
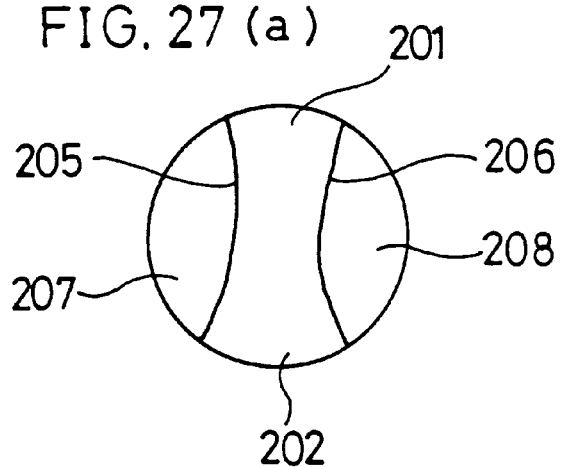
FIGS. 27(a), 27(b), and 27(c) are explanatory diagrams showing examples of the lens refraction characteristics.
Figure 27:
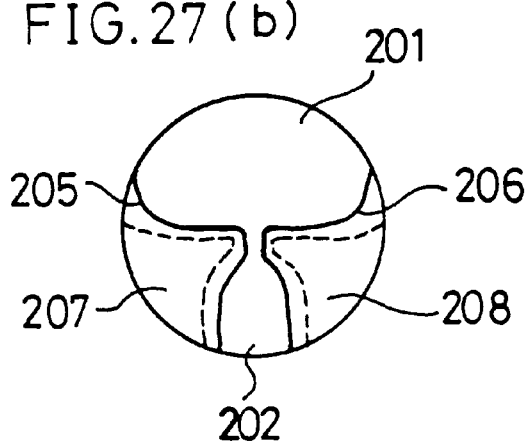
Figure 27:
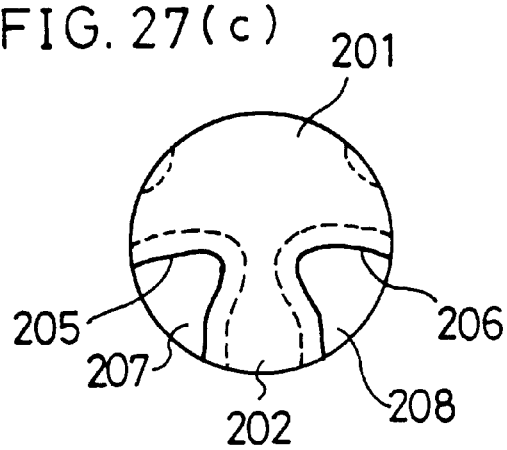

As an example of this type, the far point portion 201 is wide as shown in FIG. 26.

(ii) Near-point importance type (for indoor rooms (reading))

If the usage purpose input to the arithmetic control circuit 101a is an indoor purpose, the arithmetic control circuit 101a will slightly increase the refractive degrees of a far point. For example, the refractive degrees of this type are obtained as:

"For a far point:–4D
Added degree:+2D"

As an example of this type, the near point portion 202 is wider than the far point portion 201 as shown in FIG. 27(a). Also, as shown in FIGS. 27(b) and 27(c), the far point portion 201 is narrower than that shown in FIG. 26 and the near point portion 202 is wide.

(iii) Far-near importance type

If the usage purpose input to the arithmetic control circuit 101a is a far-near purpose, the arithmetic control circuit 101a will obtain the refractive degrees of this type as:

"For a far point:–5D
Added degree:+3D"

Figure 28:
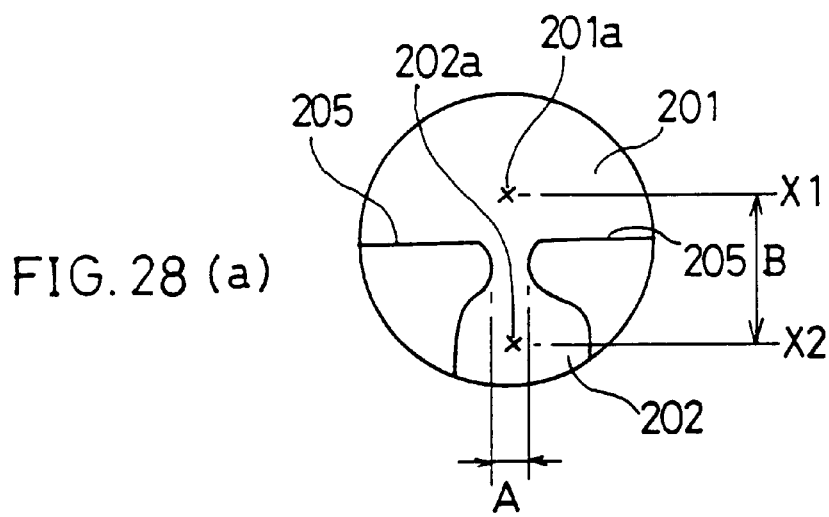
FIG. 28(a) is an explanatory diagram showing still another example of the lens refraction characteristics.
FIG. 28(b) is a characteristic diagram showing the relation between the distance B and the width A of FIG. 28(a)
FIG. 28(c) is a characteristic diagram showing the relation between the distance B and the cylindrical degree of FIG. 28(a)
FIG. 28(d) is a characteristic diagram showing the relation between the width A and the added degree of FIG. 28(a)
Figure 28B:
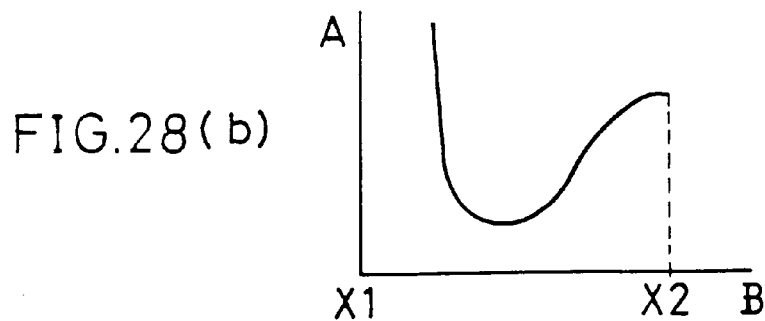
Figure 28C:
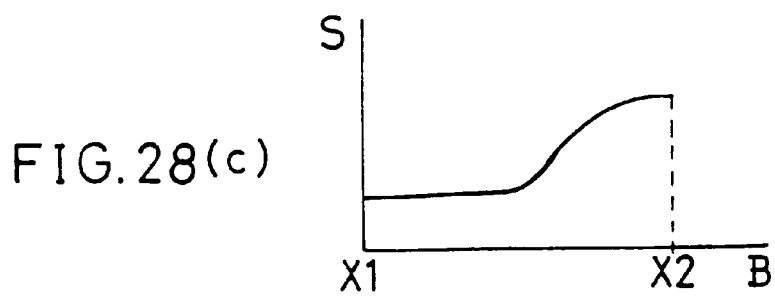
Figure 28D:
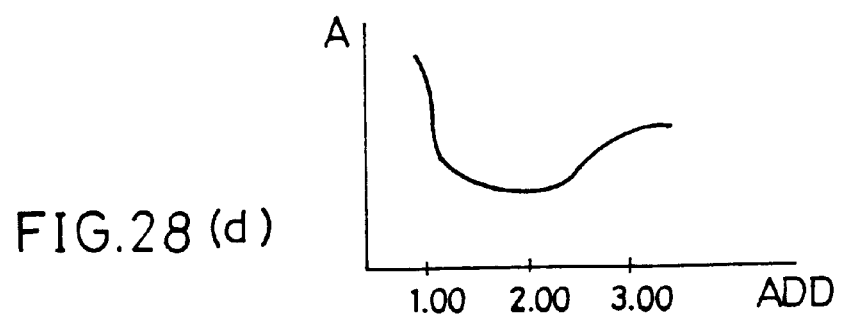

As an example of this type, the far point portion 201 and the near point portion 202 are relatively wide as shown in FIG. 28(a). In the figure, the far point 201a in the far point portion 201 is represented by X1, the near point 202a in the near point portion 202 by X2, the distance between X1 and X2 by B, the width between the constant degree lines 205 and 206 by A, and the spherical degree by S. If the width A between the constant degree lines 205 and 206, shown in FIG. 28(a), moves from point X1 to point X2, it will change as shown in FIG. 28(b). At this time, the spherical degree S changes as shown in FIG. 28(c), as it moves from point X1 to point X2. Furthermore, the relation between the width A and the added degree ADD changes as shown in FIG. 28(d).

The arithmetic control circuit 101a as comparison means compares the refractive degree obtained in this way with the refraction characteristics of eyeglasses currently being used and then computes a degree difference between them. Next, the arithmetic control circuit 101a judges whether or not the computed degree difference is within a certain threshold value in which the aforementioned parameters are present. The arithmetic control circuit 101a returns the judgment result to the PC 72 in the eyeglass store 70 by communication, and the judgment result is displayed on the TV monitor 102.

More specifically, in the judgment, if the degree difference is within a predetermined range, the arithmetic control circuit 101a will cause the monitor 3 (notification means) of the PC 72 to display that the eyeglasses currently being used are suitable, and if the degree difference is outside the predetermined range, the monitor 3 will display that the eyeglasses are not suitable. Note that if the eyeglass store 70 is provided with the arithmetic control circuit 101a and the peripheral equipment, in the eyeglass store 70 the effects described in the aforementioned (a) and (b) can be obtained at once without transferring data by communication.

In addition, in the aforementioned judgment, the arithmetic control circuit 101a can display a lens usage type on the TV monitor 102. In this case, the arithmetic control circuit 101a can be constructed so that it performs judgment in view of relational parameters such as width A, distance B, and added degree ADD shown in FIGS. 28(b) through 28(d).

Figure 29:
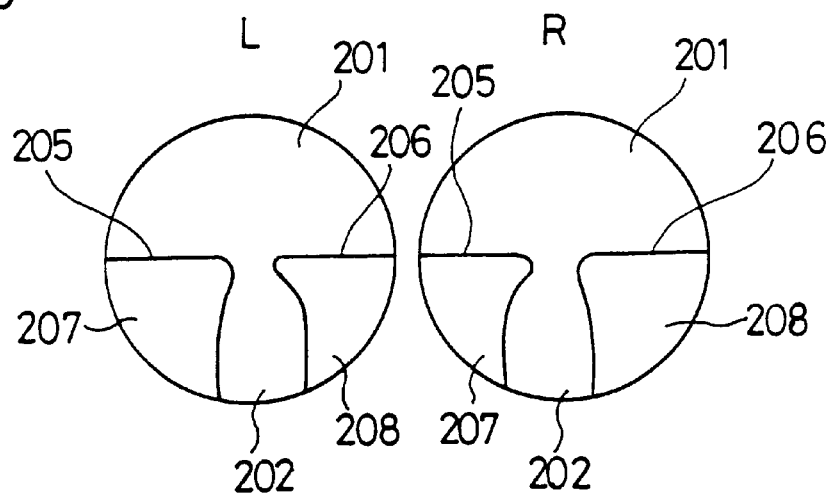
FIG. 29 is an explanatory diagram showing an example of the lens refraction characteristics for right and left eyes.
Figure 30:
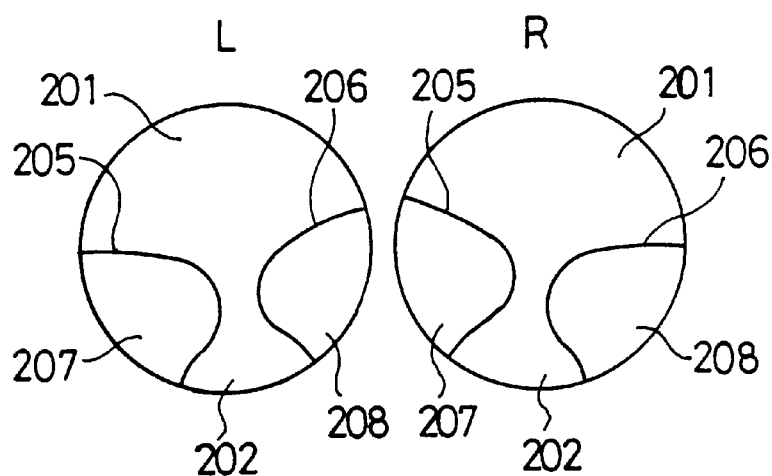
FIG. 30 is an explanatory diagram showing another example of the lens refraction characteristics for right and left eyes.
Figure 31:
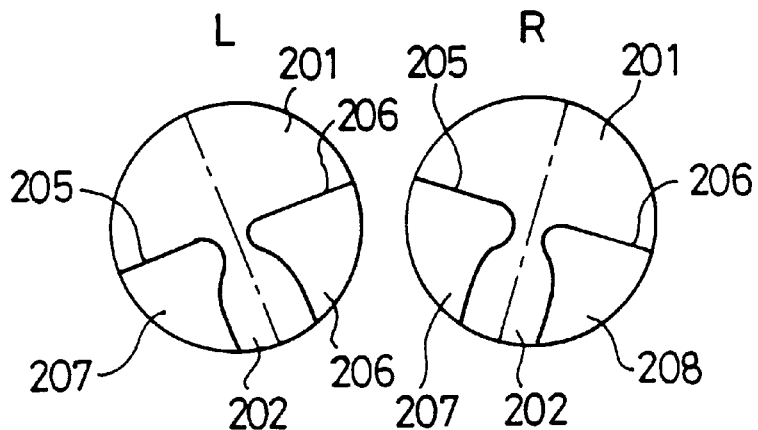
FIG. 31 is an explanatory diagram showing still another example of the lens refraction characteristics for right and left eyes.

Furthermore, when the types of right and left lenses R and L are compared with each other, there is a horizontal symmetrical type such as that shown in FIG. 29 or 31 and an asymmetrical type such as that shown in FIG. 30. These characteristic diagrams can be utilized in judging a lens usage type.

(v) Display of a Refraction Characteristic Image and Other Information

Figure 32:
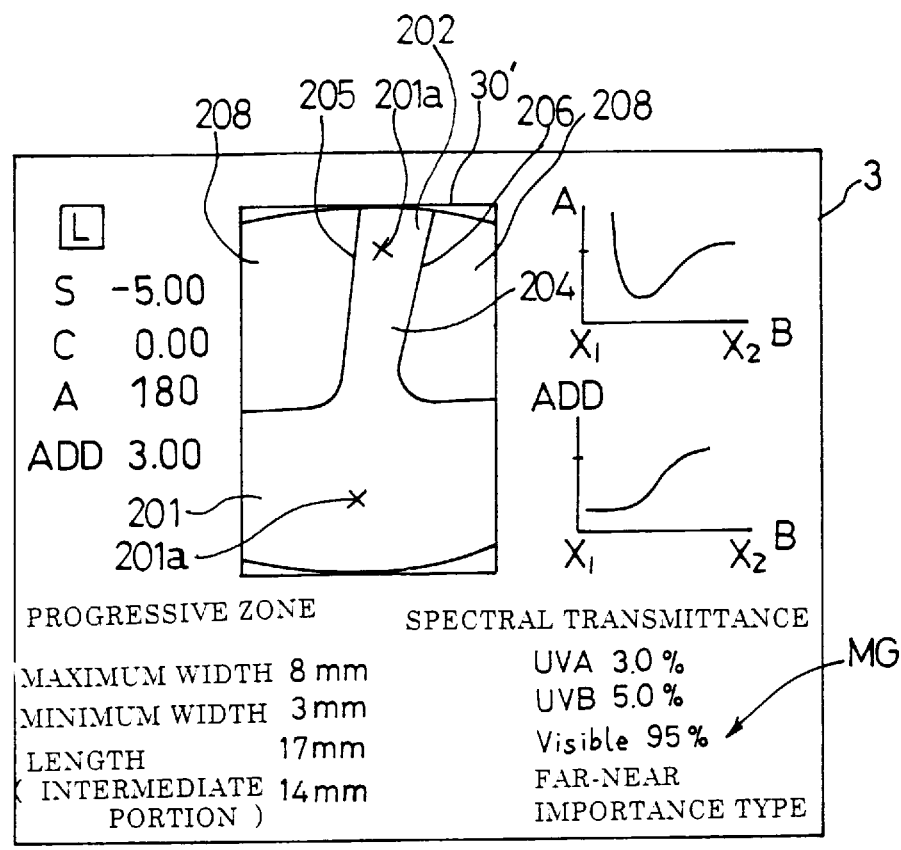
FIG. 32 is an explanatory diagram showing an example of the refraction characteristic image and measurement results displayed on a display unit.

The result obtained in the aforementioned way may be displayed on the monitor 3 of the lens meter or the TV monitor 102, as shown in FIG. 32.

In the figure, a refraction characteristic image G which is refraction characteristic distribution information, a characteristic diagram Q1 showing the relation between the width A of a progressive zone and the distance B from the far point 201a (X1) to the near point 202a (X2), and a characteristic diagram Q2 showing the relation between the added degree ADD of a prescription and the distance B of a progressive zone are simultaneously displayed on the monitor 3 or the TV monitor 102. Moreover, in addition to spherical degree S, cylindrical degree C, cylindrical axial angle A, and added degree ADD, the maximum width, minimum width, length (distance B), and intermediate portion (distance between X1 and a point at which an added degree gradually increasing from X1 toward X2 reaches the half value of the added degree of a prescription) of a progressive zone and a message MG informing the type of a measured subject lens (far-point importance type, near-point importance type, far-near importance type, etc.) are displayed on the monitor 3 or the TV monitor 102.

The characteristic diagrams Q1 and Q2 and the value of the intermediate portion (distance between X1 and a point at which an added degree gradually increasing from X1 toward X2 reaches the half value of the added degree of a prescription) are obtained by the arithmetic control circuit 101a. If the characteristic diagrams Q1 and Q2 and the value of the intermediate portion are obtained, the type of a measured subject lens (far-point importance type, near-point importance type, far-near importance type, etc.) can easily be determined. If the obtained type is displayed as message MG on the monitor 3 or the TV monitor 102, the type of a subject lens can easily be known without judgment of a measurer. The horizontal offset quantity of the near point 202a with respect to the far point 201a has been determined depending on makers. Therefore, if the horizontal offset quantity of the near point 202a with respect to the fax point 201a is obtained by the arithmetic control circuit 101a, this offset quantity can be employed to specify the maker of a subject lens. Moreover, this offset quantity may be displayed on the monitor 3 or the TV monitor 102.

Example of Specification of a Subject Lens based on Spectral Transmittance

As previously described, the filter disc 60 is provided with a first filter portion 61 which transmits ultraviolet light UVA with a wavelength of 280 nm to 315 nm and also shuts out light of other wavelengths, a second filter portion 62 which transmits ultraviolet light UVB with a wavelength of 315 nm to 380 nm and also shuts out light of other wavelengths, a third filter portion 63 for obtaining the spectral transmittance of visible rays in a range of 380 nm to 800 nm, and a transmitting hole 64. Moreover, the third filter portion 63 is provided with filter portions 63a through 63n which can select a transmitted wavelength in stages between 380 nm and 800 nm. The filter disc 60 is rotated by the drive motor (drive means) 65 such as a pulse motor.

In order to measure the spectral transmittance of a subject lens by making use of the filter disc 60 constructed as described above, the processing circuit 37 controls the operation of the drive motor 65, thereby rotating the filter disc 60. The filter portions 61, 62, and 63a through 63n of the filter disc 60 are sequentially disposed in the optical path. On the other hand, the first light source 21, constituted by a halogen lamp which emits light in a range between an ultraviolet ray and an infrared ray, is lit. In the light emitted from the light source 21, light with a wavelength of 280 nm to 315 nm, light with a wavelength of 315 nm to 380 nm, and light with a wavelength of 380 nm to 800 nm are selectively transmitted in sequence by the filter portions 61, 62, and 63a through 63n of the filter disc 60 and are projected on a subject lens.

Figure 33:
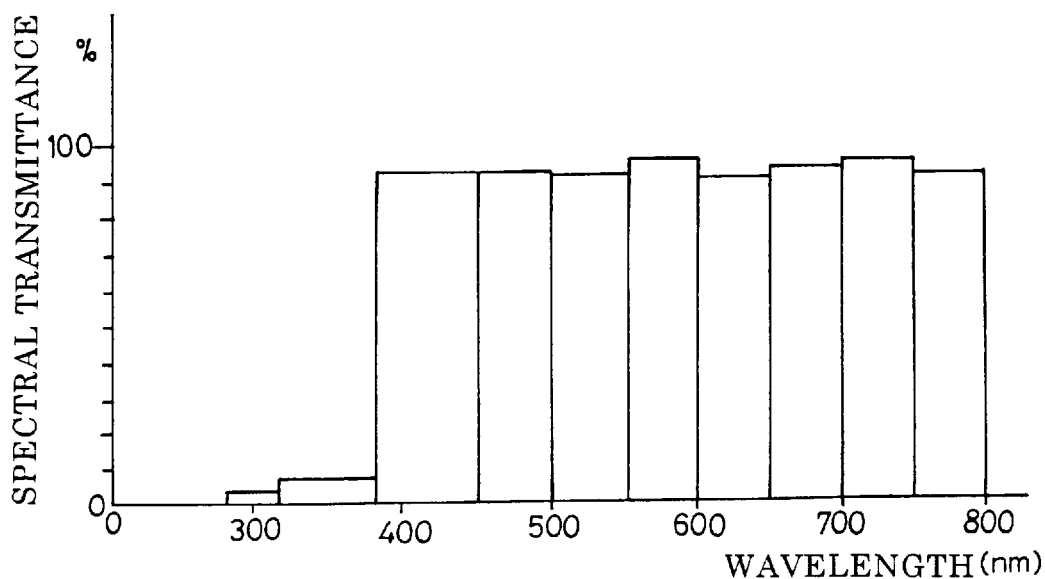
FIG. 33 is a bar graph showing another display example of spectral transmittance.

With this projection, light with a wavelength of 280 nm to 315 nm, light with a wavelength of 315 nm to 380 nm, and light with a stepwise wavelength of 380 nm to 800 nm are selectively transmitted through the subject lens and are projected onto the area CCD 35. Therefore, in the case where filter portions 61, 62, and 63a through 63n are not employed, when the measuring light with total wavelengths, emitted from the light source 21, is transmitted through the subject lens, the transmitted light quantity is measured by the output signal from the area CCD 35, and the total wavelength transmitted light quantity of the subject lens by total wavelengths is obtained. On the other hand, when light with each wavelength reaches the area CCD 35, the light quantity is measured by the output signal from the area CCD 35, and each individual wavelength transmitted light quantity of the subject lend by each wavelength light is obtained. The ratio of each individual wavelength transmitted light quantity to the total wavelength transmitted light quantity is obtained, and this ratio (%) is displayed on the UVB, and Visible portions of the screen 3 or TV monitor 102, as shown in FIG. 32. In the case of visible rays, the average value of the transmittance of the subject lens by each wavelength light is displayed. Also, the spectral transmittance by each wavelength may be displayed with a bar graph, as shown in FIG. 33.

Furthermore, a great number of point images which are projected on the area CCD 35 become small or large due to the refractive index of a subject lens. Therefore, when a light quantity for obtaining spectral transmittance is measured, the absolute light quantity of a point image of light projected on the CCD 35 is obtained. The absolute light quantity is compared with a light quantity obtained when light was not transmitted through the subject lens. In this case, since the point image becomes large or small in correspondence with the degree of a subject lens, integral calculus is required or correction is required in correspondence with a lens degree.

In the case where the aforementioned spectral transmittance is obtained and displayed, when a damaged eyeglass lens is an UV cut-off lens, that is, a lens with a ultraviolet reflection coating and has a spectral transmittance of certain % or when it is not a ultraviolet cut-off lens, the spectral transmittance (%) of a visible ray by the coating can be known, Thus, if the light transmittance of a lens by a coating is known for each wavelength, a coated lens with the same spectral transmittance (%) can easily be selected when the other lens is processed. Therefore, if not only the configuration of the progressive portion of a progressive lens but also spectral transmittance is judged as lens information, the balance between the right and left lenses can be judged synthetically and can be optimized even in the case where one of the right and left eyeglass lenses is damaged and therefore the other is replaced.

Figure 9C:
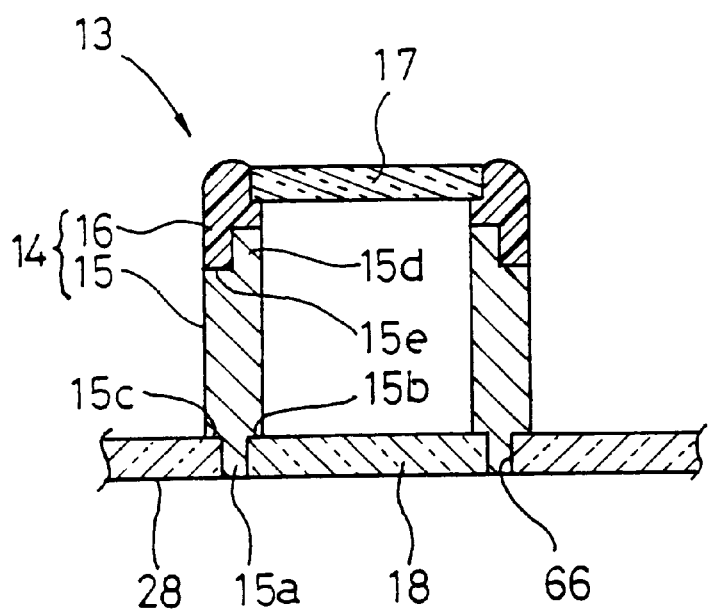
FIG. 9(C) is an enlarged view showing the lens receiver of FIG. 9(A)

In the aforementioned embodiment, while the spectral transmittance in a visible wavelength band has been measured by sequentially selecting the filter portions 63a through 63n provided in the filter disc 60, the present invention is not necessarily limited to this. For example, as shown in FIG. 9(E), the wavelengths 280 nm to 800 nm between a ultraviolet light band and a visible light band is divided into four wavelength bands, and a filter portion 64 which transmits the four wavelength bands may be provided in the filter disc 60. In this case, as shown in FIG. 9(H), the filter portion 64 has filter portions 64a, 64b, 64c, and 64d which transmit four wavelength bands and a light shielding portion 64e which shuts out light. In addition, as shown in FIG. 9(D), the filter portion 64 is provided with a lens 700, by which the filter portion 64 is conjugated with the diffusing plate 32.

Figure 9D:
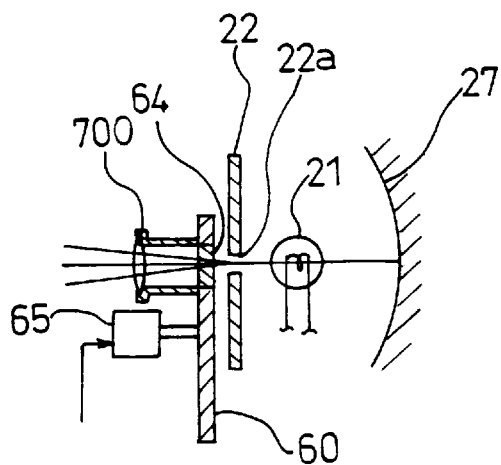
FIG. 9(D) is a plan view showing another example of the filter disc.
Figure 9E:
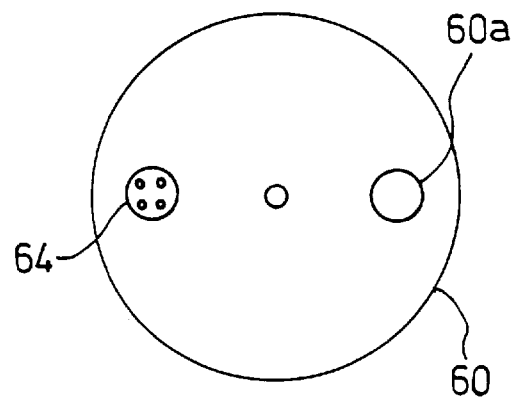
FIG. 9(E) is an enlarged plan view showing a portion of the filter disc shown in FIG. 9(D)
Figure 9F:
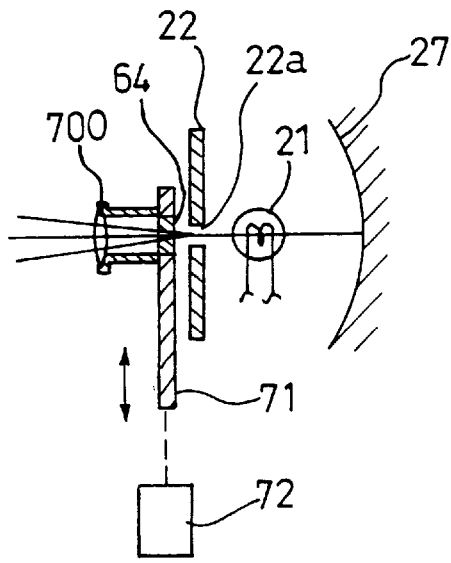
FIG. 9(F) is a plan view showing the spot images projected on an area CCD by employing the filter portions of FIG. 9(D)
Figure 9G:
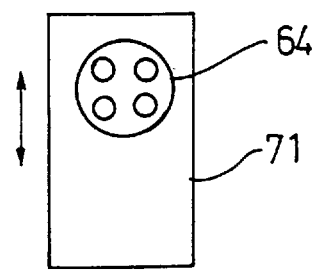
Figure 9H:
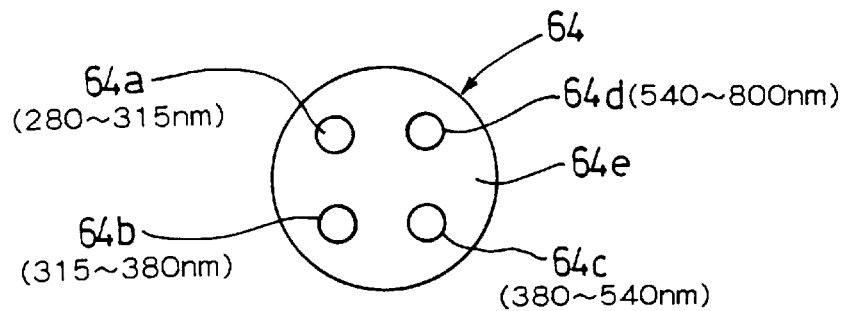
Figure 9I:
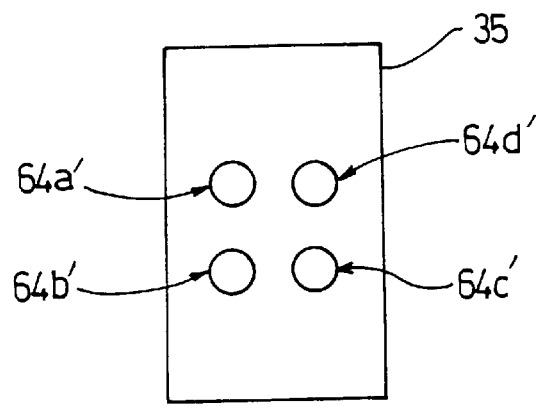
Figure 9J:
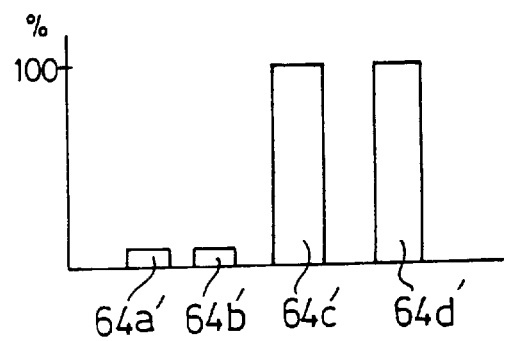

When spectral transmittance is measured with the filter portion 64, as shown in FIG. 9(I), light spot image groups 64a' through G4d' which are regulated by the filter portions 64a through 64d are projected on the area CCD 35, and spectral transmittance, which is designated as 64a" through 64d" in FIG. 9(J), can be measured at a time from the light spot image groups 64a' through 64d'. The spectral transmittance 64a" through 64d" correspond to the light spot image groups 64a' through 64d", respectively.

In the embodiment shown in FIGS. 9(D) and 9(E), the filter disc 60 is provided with the filter portion 64 and is rotated by the drive motor 65 so that the filter portion 64 is inserted into the optical path or removed therefrom. However, the present invention is not limited to this. For example, as shown in FIGS. 9(F) and 9(G), a filter plate 71 provided with a filter portion 64 may be inserted into the optical path or removed therefrom by a solenoid 72.

Modification

In the aforementioned embodiment, a structure, such as the one shown in FIG. 9(C), can be adopted as the lens receiver 13. In FIG. 9(C), the lens receiver 13 has a patterning plate 28 with an attaching hole 66 at the central portion and a cylindrical lens receiving member 14 attached to the patterning plate 28.

The cylindrical lens receiving member 14, as shown in FIG. 9(C). has a metal cylindrical body 15 and a synthetic resin lens support ring 16. The lower end portion of the cylindrical body 15 is formed with a small-diameter portion 15a extending in the circumferential direction thereof, an inner annular stepped portion 15b, and an outer annular stepped portion 15c. On the other hand, the upper end portion of the cylindrical body 15 is formed with a small-diameter portion 15d extending in the circumferential direction and an outer annular stepped portion 15e. The lens support ring 16 is fitted on the outer circumference of the upper small-diameter portion 15d and abuts the annular stepped portion 15e. The section of the upper end of the lens support ring 16 is formed into a generally semicircle, and an upper transparent glass plate 17 is fitted in and fixed to the inner circumference of the upper end of the lens support ring 16. A lower transparent glass plate 18 is fitted in the lower small-diameter portion 15a of the cylinder body 15 and abuts the inner stepped portion 15b. The lens receiving member 14 constructed as described above is attached to the patterning plate 28, by fitting the lower small-diameter portion of the cylindrical body 15 into the attaching hole 66 of the patterning plate 28. The patterning plate 28 may be replaced with a transparent glass plate. In this case, between this glass plate and the screen 32 a patterning plate with the same pattern as the patterning plate 28 is interposed.

(2) Second Embodiment

In the aforementioned embodiment, although the eyeglass store 70 has had access to the host computer 100 to obtain information such as the maker and model type of the subject lens 30, the present invention is not necessarily limited to this. For example, the PC 72 in the eyeglass store 70 may have the aforementioned functions provided on the side of the host computer 100, and as shown by a broken line in FIG. 1, the same information recording/regeneration unit 104' as the information recording/regeneration unit 104 may be connected to the PC 72 so that information, such as the maker and model type of the subject lens 30, can be obtained in the eyeglass store 70.

Also, the processing circuit 37 of the lens meter 1' may have the aforementioned functions provided on the side of the host computer 100, and as shown by a broken line in FIGS. 2 and 9(A), the same information recording/regeneration unit 104" as the information recording/regeneration unit 104 may be connected to the processing circuit 37 of the lens meter 1' so that information such as the maker and model type of the subject lens 30 can be obtained in the eyeglass store 70. Such a lens meter may be installed in the eyeglass store 70. The information recording/regeneration unit 104" can be built in the lens meter 1, so that the lens meter 1 itself can also perform the mapping of refraction characteristics of a subject lens and specify the subject lens based on spectral transmittance. In this case, the measuring optical system of the lens meter 1 serves as lens measurement means, the processing circuit 37 serves as lens judgment means, and the monitor 3 serves as notification means.

Even in this case, as described above, when the eyeglass store 70 has not handled the same maker as the subject lens 30 measured in the aforementioned way, or when a customer desires to have lenses made by a maker other than the measured maker, the list of makers and model types having lenses with data similar to the measured subject lens 30 can be displayed by controlling the PC 72 in the eyeglass store 70. In addition, a diagram showing the refractive power distribution of a desired lens can be displayed or it can be employed as a description to customers.

(3) Third Embodiment

FIGS. 34 through 37 show a third embodiment of the present invention. In FIG. 34, reference numeral 40 designates an LED used as a light source for generating a measuring light beam, reference numeral 41 designates a diffusing plate, and reference numeral 42 designates a pin hole. The LED 40, diffusing plate 41, and pin hole 42 make up a light source portion for generating a measuring light beam. The pin hole 42 serves as a diffusion secondary point light source. A light beam emitted from the pin hole 42 is converted into parallel rays of light by a collimator lens 44 disposed in an optical path. A lens receiver 45 is disposed in the optical path, and a subject lens 47 is set on the lens receiver 45. If the subject lens 47 is an eyeglass lens, the lens receiver 45 to be used is approximately 8 φ (mm) in diameter. If the subject lens 47 is a contact lens, a lens meter 45 whose diameter is approximately 5 φ (mm) is used.

Behind the lens receiver 45, there is disposed an optical characteristic measurement pattern 48 having four apertures 48a, as shown in FIG. 35(a). However, the number of the apertures 48a to be required is at least three. The reason is that at least three apertures enable calculation of optical characteristic values. Preferably, the number of the apertures 48a is four because, if there are too many apertures, much time is consumed in calculation. In this embodiment, four apertures are provided. Each of the apertures 48a is circular, and is at a distance of L from a measuring optical axis O at a right angle to each other. For the measurement of the subject lens 47 which is rotationally asymmetrical, such as a progressive power lens, it is preferable to dispose the apertures 48a at vertically symmetrical positions.

Between the lens receiver 45 and the optical characteristic measurement pattern 48, a filter plate 80 for spectral characteristic measurement is disposed so as to be inserted into the optical path or removed therefrom by a solenoid 81. When the filter plate 80 is between the lens receiver 45 and the pattern (pattern plate) 48, the filter plate 80 is close to the pattern 48, and both the filter plate 80 and the pattern 48 are substantially conjugate to the pin hole 42. In addition, as shown in FIG. 35(b), the filter plate 80 is provided with four filter portions 80a, 80b, 80c, and 80d which transmit light of four wavelength ranges obtained by dividing wavelengths of 280 nm through 800 nm ranging from an ultraviolet-light region to a visible-light region. In more detail, the filter portion 80a transmits light in the wavelength range 280 nm through 315 nm, the filter portion 80b transmits light in the wavelength range 315 nm through 380 nm, the filter portion 80c transmits light in the wavelength range 380 nm through 540 nm, and the filter portion 80d transmits light in the wavelength range 540 nm through 800 nm.

A convergent lens 49 is fit on the aperture 48a. In order to bring a measurement value of optical characteristics obtained by an automatic lens meter close to a measurement value of optical characteristics obtained by a manual type lens meter to the utmost, it is preferable to make the aperture 48a as large-sized as possible. If the subject lens 47 is a contact lens, it is required that the circumscribed circle of the four apertures 48a is less than 5 mm in diameter because the opening of the lens receiver 45 is 5 φ. When the subject lens 47 whose power is plus and high is measured, if the aperture 48a is too large in size, light point images come into contact with each other, and thus it becomes impossible to calculate a gravitational center of the light point image. On the other hand, if the distance L between the center O1 of the aperture 48a and the measuring optical axis O is short, measurement sensitivity is weakened. And if the distance L therebetween is too large, when the subject lens 47 whose power is minus and high is measured, light spot images protrude from an effective area of a two-dimensional image receiving sensor, which will be described later. Accordingly, preferably, the distance L between the center O1 of the aperture 48a and the measuring optical axis O is 1 mm or so, and the size of the aperture 48a is 1 φ or so.

The optical characteristic measurement pattern plate 48 may be constructed such that, for example, a glass plate is provided with a metal frame, and microlenses are fixed to the metal frame. Alternatively, as the pattern plate 48, use may be made of a mold lens in which, according to a molding method, four convergent lenses 49 are fit to a resinous plate or glass plate. Alternatively, use may be made of a pattern plate in which a condenser lens 49 utilizing the diffraction is formed in a glass plate by etching. It is preferable to form portions other than the convergent lens 49 out of, for example, chromium for shielding the light.

Behind the pattern plate 48, there is a disposed an area CCD 50 used as a two-dimensional image receiving element. If a plus and most powerful measurable lens 47 is set in the optical path 43, the distance Z between the area CCD 50 and the lens receiver 45, in other words, the distance Z between the two-dimensional image receiving element and the apex of the rear surface of the subject lens 47 is designed to be shorter than a back focal distance of the lens 47. This is for the purpose of avoiding the superimposition of light spot images upon each other or the inversion of a measuring light beam which has passed through the subject lens 47.

Figure 36:
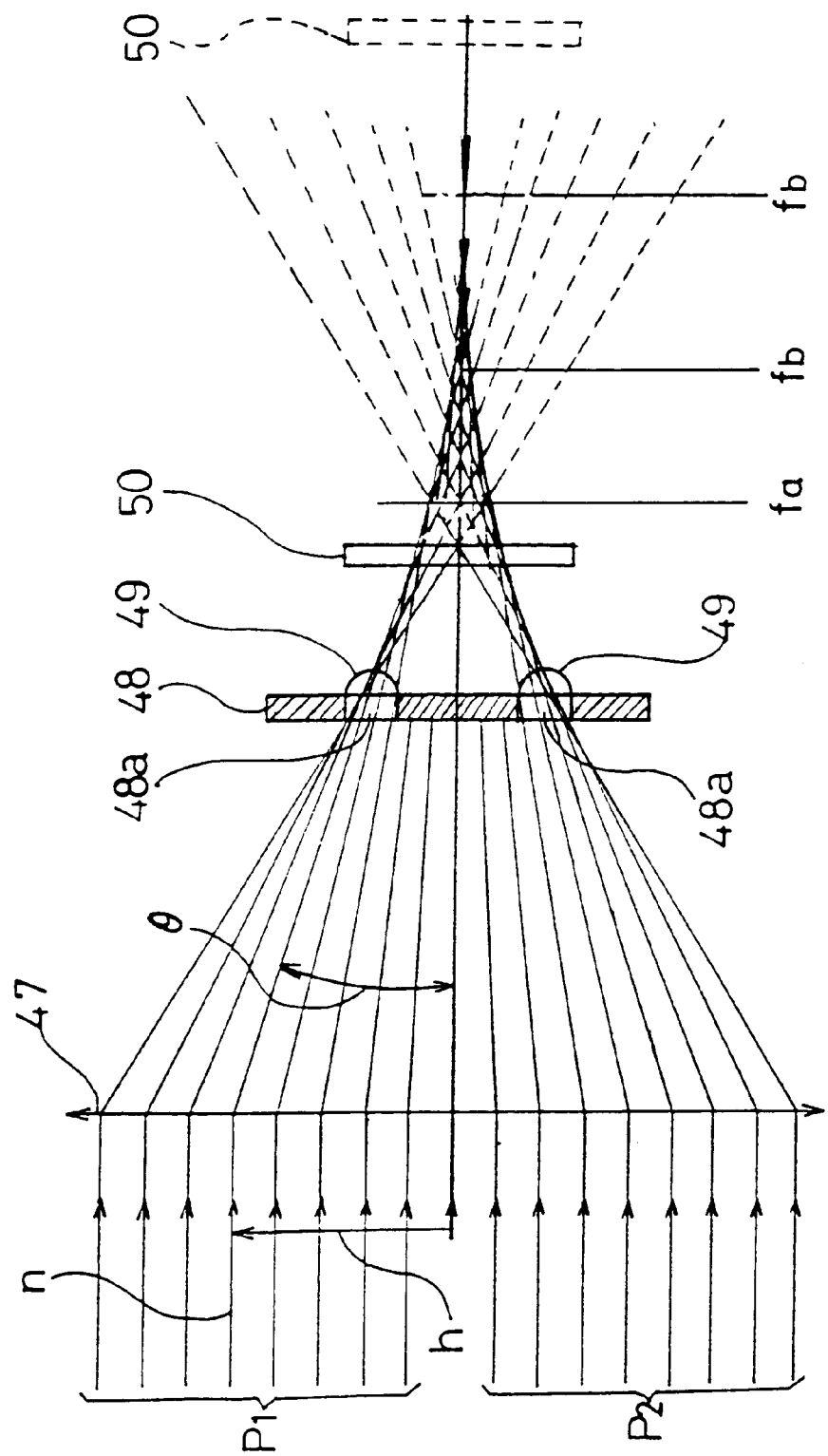
FIG. 36 is a schematic view showing the operation of the optical system of FIG. 34.

In detail, as shown in FIG. 36, if the area CCD 50 is disposed at the position indicated by the broken line, the measuring light beam P1 which has passed through the upper half of the subject lens 47 forms an image at the lower part of the area CCD 50, whereas the measuring light beam P2 which has passed through the lower half of the lens 47 forms an image at the upper part of the area CCD 50. Accordingly, the inversion of the measuring light beam P occurs which makes it impossible to determine to which light spot image on the area CCD 50 the light beam P which has passed through the lens 47 corresponds.

Therefore, for example, in the case of the subject lens 47 which is measurable with an automatic lens meter and whose measurement power is ±25, it is preferable to arrange the distance Z between the lens receiver 45 and the area CCD 50 to be 20 mm through 30 mm because the back focal distance Z1 is 40 mm. If the distance Z therebetween is arranged to be less than 20 mm, measurement sensitivity will become dull. However, this is not applied to a situation in which a relay lens is disposed between the lens receiver 45 and the area CCD 50.

In addition, if the subject lens 47 has power high in frequency of measurement, such as weak power of −2.5D, it is preferable to set the subject lens 47 in the optical path 43 so that the size of a light spot image is minimized on the area CCD 50, from the viewpoint of lessening the influence of flaws and stains upon measurement, A measuring ray of light n striking the subject lens 47 is deflected after passing through the lens 47. An angel θ of the deflection thereof depends on an incidence height h and the power S of the lens 47 at an incident position, as follows:

$$S = \tan\theta / 10h$$

where the incidence height h has a known value.

Figure 37:
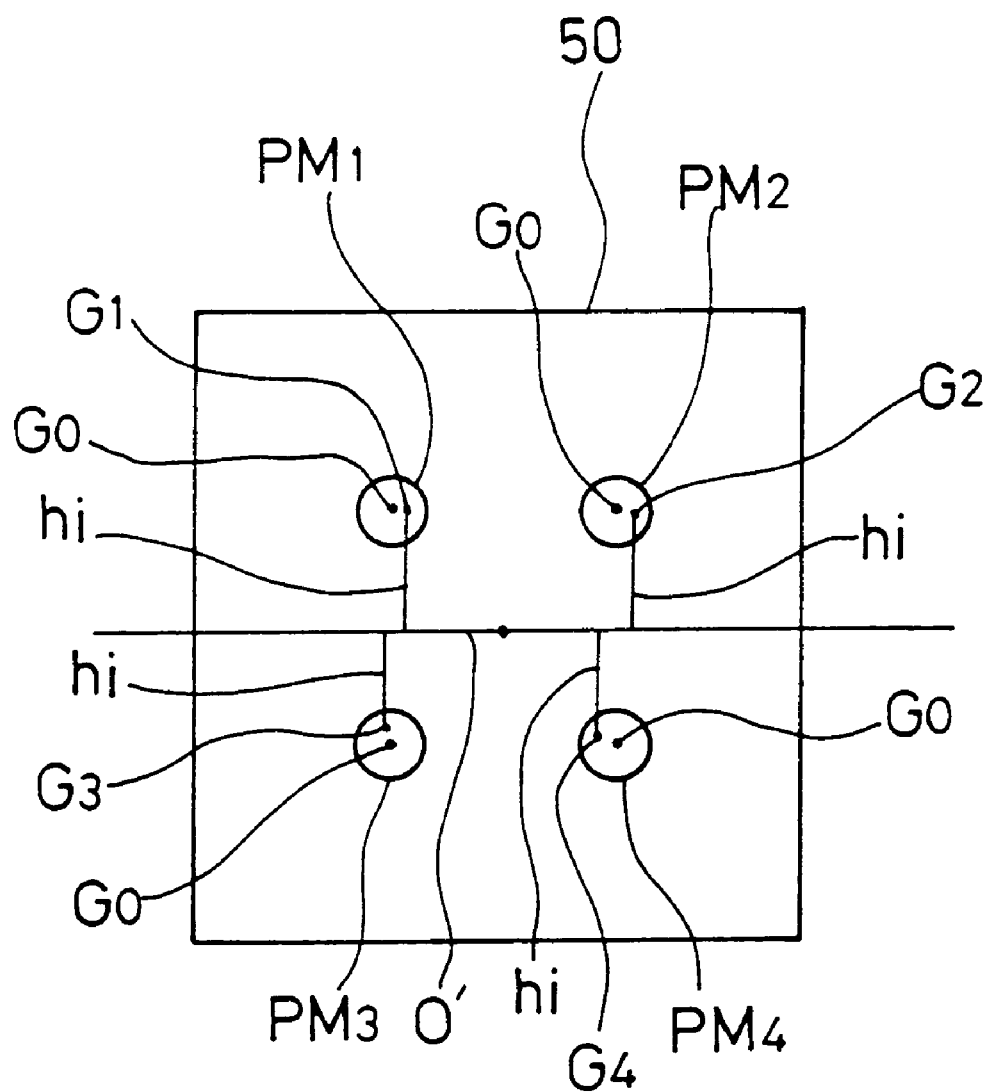
FIG. 37 shows a relationship between the pattern shown in FIG. 34 and a rear CCD.

The angel θ of the deflection is expressed as follows:

$$\theta = (h - hi/Z)$$

where hi is a height from a center line O' of the area CCD 50 as shown in FIG. 37.

Accordingly, if center-of-gravity positions G1 through G4 are determined, the power S of the lens 47 is determined.

If the subject lens 47 has plus power, distances between the light spot images PM1 through PM4 are narrowed. If the lens 47 has minus power, distances therebetween are widened. If the lens 47 is a spherical lens and has no distortion, centers G0 of the light spot images PM1 through PM4 are evenly spaced away from the center line O', but if it has a distortion, distances between the respective centers G0 and the center line O' differ from each other.

In the present invention, since the aperture 48a is formed as large as possible, many thin shafts of light undergo the influence of the aberration of the lens 47 and pass through the aperture 48a. Therefore, the center-of-gravity positions G1 through G4 of the spot images PM1 through PM4, respectively, formed on the CCD 50 are deviated from the centers (center-of-gravity positions) G0 based on a thin shaft of light, and a power value near the power obtained by a manual type of lens meter can be obtained.

Additionally, in spite of the fact that a part of the lens 47 through which the measuring beam P passes toward the apertures 48a has flaws and stains and thereby the measuring beam P is partially shut off, the deviation of the center-of-gravity positions G1 through G4 of the spot images PM1 through PM4 is small because a ratio to be shut off in this situation is smaller than in a situation in which thin shafts of light are used. Therefore, a measurement error caused by the flaws and stains becomes negligible, and thus measurement accuracy is improved.

On the other hand, when spectral characteristics of the subject lens 47 are measured, the solenoid 81 is first actuated, and then the filter plate 80 for spectral characteristic measurement is placed between the lens receiver 45 and the pattern 48, so that spot images PM1 through PM4, such as those shown in FIG. 37, are formed on the area CCD 50.

Thereafter, output signals from picture elements at the spot images PM1 through PM4 are input to an arithmetic and control circuit (processing circuit) 90. The arithmetic and control circuit 90 calculates the spectral transmittance of the lens 47 from the magnitude of the aforementioned output signals, and an obtained result, such as that shown in FIG. 9(J), is displayed on a display unit of the lens meter, i.e., on the screen 3a of the monitor 3. In this embodiment, the measuring optical system ranging from the LED 40 to the area CCD 50 serves as lens measurement means, and the arithmetic and control circuit (processing circuit) 90 serves as lens judgment means, and the monitor 3 serves as notification means.

Others

Figure 38:
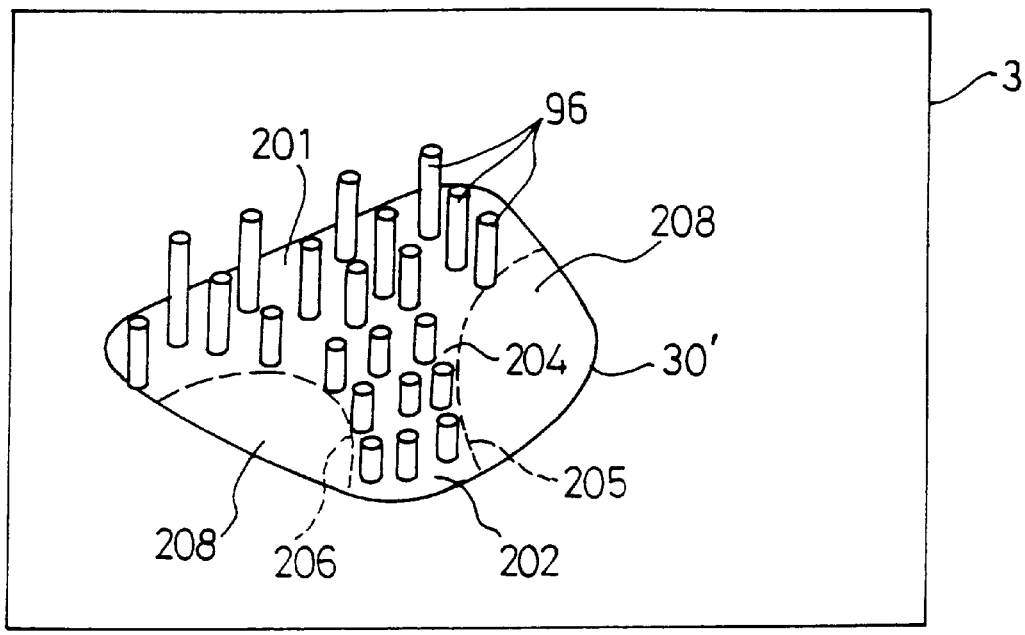
FIG. 38 shows a display example of spectral characteristics by the use of the optical system of FIG. 34.

Measurement may be made of spectral data obtained when the subject lens is continuously moved in every direction, and the obtained spectral data may be displayed in the form of a two-dimensional map. Alternatively, the obtained data may be displayed three-dimensionally as shown in FIG. 38 where use is made of a plurality of bars 96 indicating the transmittance in terms of the height of the bar 96 within the lens configuration 30'.

Figure 39:
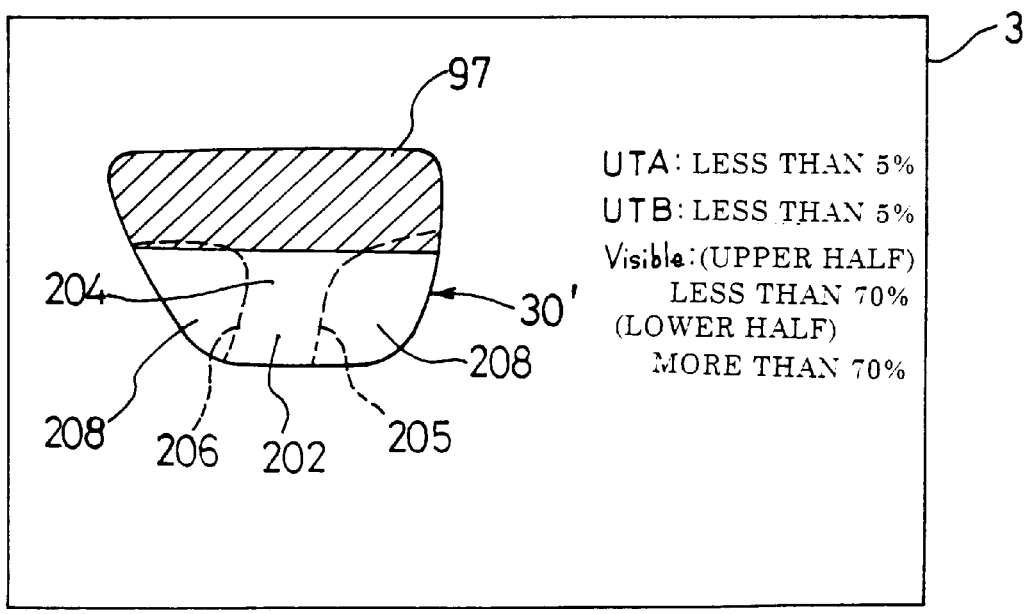

FIG. 39 shows an eyeglass lens onto which a coat is applied so as to cut ultraviolet rays UVA of 280 nm through 315 nm and ultraviolet rays UVB of 315 nm through 380 nm. In addition, the upper half of the eyeglass lens is colored with, for example, gray or brown so as to cut visible rays. A measurement result of the spectral transmittance of the eyeglass lens is displayed as shown in FIG. 39. In this figure, the transmittances of UVA and UVB and the transmittance of visible rays passing through the colored part 97 of the lens are displayed on the right side of the lens configuration 30'. The colored part 97 thereof is shown by oblique lines. According to this embodiment, a transmittance can be set based on the obtained measurement values of a plurality of areas of the lens, and the areas having values less than a predetermined value can be displayed. For example, the transmittance of UVA or UVB is less than 5%, and the transmittance of visible rays through the colored part 97 is 70%. Generally, it is customary to design a part of the lens between the colored upper half 97 and the non-colored lower half such that color density is gradually lowered from above downwards. Therefore, it is also possible to display the variation of the transmittance in the form of color variations or density variations in the figure.

In a case where one of lenses of eyeglasses is broken and a new one is required, the spectral transmittance of the remaining unbroken lens of the eyeglasses is first measured, and then the spectral transmittance of a sample lens or an unprocessed lens selected based on a measurement result of the unbroken lens is measured. After that, the spectral transmittance of the sample lens and the spectral transmittance of the unbroken lens are simultaneously displayed on the right and left of the screen, respectively, as shown in FIG. 40. Accordingly, by comparison between the respective spectral transmittances about each wavelength (i.e., by comparison of color tones which depend on the spectral transmittance about each wavelength), a judgment can be formed about whether the selected sample lens is the same or similar to the unbroken lens. In this case, a first memory M1 and a second memory M2, which are shown by broken lines in FIG. 9(A), are provided, and the transmittance of the unbroken lens is stored in the first memory M1 whereas the transmittance of the selected sample lens (or unprocessed lens) is stored in the second memory M2. The processing circuit 37 then compares the respective transmittances stored in the first and second memories M1, M2, and gives instructions to display a comparison result on the screen 3a as shown in FIG. 40. On the screen 3a, "Eyeglass lens R" or "Eyeglass lens L" indicating that the remaining unbroken lens is a right-hand lens or left-hand lens is also displayed as well as "Sample lens (or Unprocessed lens)".

Additionally, when the coloring of a plastic lens is ordered to, for example, an optician of an optical shop, the difference can be checked between a plastic lens colored according to the order and a sample plastic lens placed in the shop.

In a case where a potentiometer interrelated with the nose-pad support member 9 shown in FIG. 8(A) is provided, and a determination is made about whether the transmittance of a right lens or left lens of eyeglasses is measured from an output of the potentiometer, it is preferable to provide memory means for storing data about a right or left lens being measured and also storing the spectral transmittance (spectral characteristic) obtained by the measurement. In this case, if right and left lenses of eyeglasses are different in transmittance from each other when a new lens is fit in the eyeglasses instead of a broken lens, the difference can be found easily.

A contact lens, especially a soft contact lens, excellent in oxygen permeability is liable to be stained, and therefore must be sterilized by boiling. Additionally, when the contact lens becomes very cloudy, it must be replaced with a new one. Besides, it is difficult to, with the eye, determine the degree of cloud of the contact lens. However, the measurement of the spectral transmittance (spectral characteristic) mentioned above makes it possible to determine the degree of cloud thereof with accuracy. Therefore, by measuring the transmittance of the contact lens, a judgment can be easily formed about whether the contact lens should be replaced with a new one. Also, each optical shop can set a value (border-line) for determining the replacement of a contact lens which is subject to variation of transmittance because of the cloud of the contact lens.

Additionally, as mentioned above, the filter for spectral transmittance measurement is disposed detachably in the optical path of the optical system of the conventional lens meter so that refraction characteristics of the subject lens can be measured when the filter is out of the optical path whereas the spectral transmittance of the subject lens can be measured when the filter is in the optical path. Accordingly, there is no need to move the subject lens mounted on the lens receiver 13 onto another member for spectral transmittance measurement. Therefore, the refraction characteristic measurement and the spectral transmittance measurement are swiftly changed over and easily made. Besides, when the refraction characteristics of the subject lens are measured at each position of the lens and are displayed in the form of a map, the spectral transmittance of the subject lens at each position corresponding to that of the map can be exactly superimposed upon the map.

(4) Fourth Embodiment

FIGS. 41 to 46 show a fourth embodiment of the present invention. According to this embodiment, some of the components of the optical system shown in FIG. 9(A) of the aforementioned lens meter 1, such as the filter disk 60, the light source 23, and the pin hole 24, are not used, and in addition, a total-reflection mirror is used instead of the perforated mirror 25.

A measurement optical system (lens measuring means) 20 shown in FIG. 41 includes a light source portion (an illumination optical system) 20a and a light-receiving portion (a light-receiving optical system) 20b.

The light source portion 20 includes a light source 21 for generating a measuring light beam, a pin hole plate 22, a mirror 25, and a collimator lens 26 in this order. The light-receiving portion 20b includes a patterning plate 28, a screen 32, a mirror 33, an image forming lens 34, and an area CCD (light-receiving means or a light-receiving portion) 35 of a CCD camera 36. A processing circuit 37 which functions as lens judgment means is connected to the area CCD 35. Memories 1 to n are connected to the processing circuit 37. In this embodiment, the same reference characters are given to the same components as those mentioned in the aforementioned embodiments, and a description of them is omitted.

The processing circuit 37 which functions as lens judgment means is connected to the area CCD 35. The processing circuit 37 is set so as to judge whether the subject lens is a spherical lens or an aspherical lens, by a spherical degree value distribution on the subject lens. In this case, a judgment result obtained by the processing circuit 37 is displayed in the form of "spherical lens" or "aspherical lens" on a bottom part of a display screen 3a of a monitor 3. Accordingly, it is easy to ascertain whether the subject lens is a spherical lens or an aspherical lens.

As mentioned above, a lens meter capable of performing mapping of the degree value distribution with the patterning plate 28 is used for measuring values to judge whether the subject lens is a spherical lens or an aspherical lens. However, the present invention is not necessarily limited to this. For example, a normal type of lens meter which does not include the patterning plate 28 may be used therefor.

In detail, one of the left and right lenses (the subject lenses) of eyeglasses is set on a lens receiver of the normal type lens meter, and the prism value of the lens is measured at intervals of, for example, 0.1 second (at predetermined intervals) while the lens is being moved forward or backward. Thus, the prism value of the lens is measured at a plurality of different temporal points, and a judgment on whether the subject lens is a spherical lens or an aspherical lens can be formed from the prism value at the plurality of different temporal points by means of the processing circuit 37 (arithmetic control circuit) disposed inside of the lens meter. Therefore, not by modifying the basic construction of the normal type lens meter, but simply by resetting the program, it is possible to ascertain whether the left and right lenses (the subject lenses) of the eyeglasses are each a progressive lens or a single-vision lens, and whether it is a spherical lens or an aspherical lens if it is the single-vision lens.

Thus, in the case where the processing circuit 37 is set such that whether the subject lens is a spherical lens or an aspherical lens can be judged from the spherical degree value and the prism value on the subject lens, it is required to obtain the spherical degree and the prism value at least at three points, such as a central point, a middle point, and a peripheral point. After that, the obtained spherical degrees and prism values are stored in memories 1 to n, and the spherical degrees and prism values stored in the memories 1 to n are compared with each other by means of the processing circuit 37. Herein, whether the subject lens is a spherical lens or an aspherical lens can be judged by comparing the value at a central point with that of a peripheral point of the subject lens. The reason is that the processing circuit 37 serving as lens judgment means can judge the subject lens to be an aspherical lens if the spherical degree value at a peripheral point of the subject lens is smaller than that at a central point thereof. Herein, from the difference between the prism values, the lens judgment means determine whether each value is one at a central point or a peripheral point of the subject lens, Note that, even in the case where a progressive lens is used, the spherical degree value on the subject lens varies. However, if large spherical degrees exist in a peripheral portion of the subject lens than in a central portion thereof, the subject lens can be judged to be a progressive power lens or a double-focal lens. Thus, a judgment can be easily formed about whether the subject lens is a progressive power lens, a double-focal lens, or a single-vision lens, or whether it is a spherical lens or an aspherical lens. In this case, a judgment result about whether it is a spherical lens or an aspherical lens is also displayed on the bottom part of the display of the monitor 3.

Further, whether a subject lens 30 is a progressive power lens, a single-vision lens, a spherical lens, an aspherical lens, or the like can also be judged without taking account of prism values. In more detail, this judgment can be formed by the comparison between S1 and S2 of the spherical degrees S0, S1, S2 which correspond respectively to Points a0, a1, a2 shown by arrows in FIG. 41.

For example, as shown by encircled numbers 1, 2 in FIG. 42, the spherical degrees S1, S2 of lower and upper parts of a subject lens (a spectacle lens) 30 of eyeglasses (spectacles) M are measured, respectively, and then the absolute value of the difference therebetween is obtained. Thereby, whether the subject lens 30 is a progressive power lens, a single-vision lens, a spherical lens, an aspherical lens, or the like can be ascertained.

More specifically, the mode of the lens meter 1 is shifted to an automatic progression-judgement mode by operating switches 10A, 10B, 10C, and as shown in FIG. 43, the phrase "PROGRESSIVE-LENS JUDGMENT" is displayed on an upper part of the screen 3a. At the same time, a spherical degree S, a cylindrical degree C, a cylindrical axial angle A, and prism values P (the upper one is a prism value Px in an X-direction, i.e., in a left-and-right direction; the lower one is a prism value Py in a Y-direction, i.e., in a front-and-back direction) are displayed on an upper right-hand part of the screen 3a. In addition, a small display 52 indicating measured positions is displayed on a lower left-hand part of the screen 3a. A typical spectacle-lens configuration 53 is displayed on the small display 52, and the encircled number 1 is displayed on the lower part of the spectacle lens. This means that refraction characteristics on the lower part of the spectacle lens are measured.

In FIG. 43, concentric-circular marks M1, M2 designate a measurement optical axis and a concentric position of a measurement optical system 20, respectively. T designates a crossed target.

Accordingly, as shown in FIG. 25, a nose pad B of eyeglasses M is brought into contact with a nose-pad support member 9, and then the nose-pad support member 9 is rotated downward and moved right and left so that the subject lens 30 of the eyeglasses M is fixed to a middle part in a right-and-left direction of a lens receiver 13. Next, a lens pad 7 is moved forward by pivoting a control lever 8 down in a front direction, so that a lower part of the subject lens 30, which is shown by the encircled number 1 in FIG. 42, corresponds substantially to the center of the measurement optical system on the basis of the lens receiver 13. In this position, the movement of the subject lens 30 is stopped, a spherical degree S1 of the subject lens 30 is then measured, and the spherical degree S1 is stored in the memory 1.

After the measurement and data-storing are completed, the processing circuit 37 gives instructions to measure the refraction characteristics of a part shown by the encircled number 2, as shown in FIG. 44(a), within the spectacle-lens configuration 41 on the display 52, i.e., the refraction characteristics of the upper part of the spectacle lens.

Next, the lens pad 7 is moved toward a main body 2 by pivoting the control lever 8 up, so that a part of the subject lens 30, which is shown by the encircled number 2 in FIG. 42, corresponds substantially to the center of the measurement optical system on the basis of the lens receiver 13. In this position, the subject lens 30 is stopped moving, and then a spherical degree S2 of the subject lens 30 is measured, and the spherical degree S2 is stored in the memory 2.

Whether the absolute value of the difference between the spherical degrees S1, S2 is larger than a predetermined value (for example, 0.5D), that is, whether both the values have a relation of

|S1−S2|>|0.5D| is judged by the processing circuit 37.

If the value |S1−S2| is larger than the value |0.5D|, the subject lens 30 is judged to be a progressive lens by the processing circuit 37. Then, as shown in FIG. 45, with the processing circuit 37, the typical spectacle-lens configuration 53 is enlarged on the screen 3a, and boundary lines 58, 58 among a far point portion 54, a progressive portion 55, a near point portion 56, and distortion areas 57, 57 are displayed thereon. In this state, the lens pad 7 is moved forward by pivoting the control lever 8 down in a front direction. Thereby as shown by oblique lines 59 in FIG. 46, by the instructions of the processing circuit 37, the measured part is displayed, and measurements taken consecutively from the far point portion 54 toward the progressive portion 55 and the near point portion 56 are displayed by extending the oblique lines 59 step by step from the far point portion 54 toward the progressive portion 55 and the near point portion 56.

On the other hand, if the absolute value of the difference between the spherical degrees S1, S2 is smaller than the predetermined value (for example, 0.5D), the subject lens 30 is judged to be a single-vision lens by the processing circuit 37. If the absolute value of the difference between the spherical degrees S1, S2 is substantially equal to the predetermined value, the subject lens 30 is judged to be a spherical lens by the processing circuit 37. If the absolute value of the difference between the spherical degrees S1, S2 is substantially 0.1, the subject lens 30 is judged to be an aspherical lens by the processing circuit 37. As shown in FIG. 44(b), a result obtained in this way is displayed in the form of, for example, "ASPHERICAL LENS" on a lower right-hand part of the screen 3a.

In the aforementioned embodiments, while the lens meter has been employed to specify the maker and model type of a progressive power lens, it can also be employed to specify a single lens. In addition, the aforementioned lens meter can be utilized to judge whether a subject lens is a spherical lens or an aspherical lens and whether it is a high refractive lens or an intermediate refractive lens. Furthermore, the aforementioned lens meter can be employed in the case where it is judged whether a subject lens is an UV cut-off lens, from spectral transmittance.

As has been described above, the lens specifying apparatus according to the present invention comprises: lens measurement means for measuring and obtaining lens refraction characteristic distribution information of a subject lens; information recording means on which a large amount of lens information, including the lens refraction characteristic distribution information, have been recorded; lens judgment means for comparing the lens refraction characteristic distribution information measured by the lens measurement means with the lens information recorded on the information recording means and judging to which lens information the measured lens refraction characteristic distribution information corresponds; and notification means for notifying a result judged by the lens judgment means. Therefore, lens information can be easily and quickly known.

In the case where information that is obtained from the lens information by the lens judgment means is a maker's name, the maker can be quickly known when an exchange of lenses is needed. Also, in the case where information that is obtained from the lens information by the lens judgment means is a maker's name and a model type, the maker and the model type can be quickly known when an exchange of lenses is needed.

In the case where the information recording means records lens usage purpose information as lens information in correspondence with the lens refraction characteristic distribution information and where information that is obtained from the lens information by the lens judgment means is a lens usage purpose, the lens usage type can easily be known even when the type of eyeglasses currently being used is unknown.

The lens specifying apparatus further comprises ophthalmic information input means for inputting ophthalmic information of a subject. Also, the lens judgment means adds the ophthalmic information to the lens refraction characteristic distribution information and compares the added information and the lens information with each other to obtain the lens usage purpose. Therefore, the lens usage type can accurately be known.

The lens specifying apparatus further comprises usage purpose input means for inputting a usage purpose such as an indoor purpose, a sport purpose, and a driving purpose. Also, the lens judgment means judges whether or not the lens usage purpose obtained is suitable for the usage purpose input by the usage purpose input means. Therefore, it can be easily and quickly known whether or not eyeglasses currently being used is suitable for the usage purpose. Furthermore, with this, when it are found that the eyeglasses are not suitable for the usage purpose, a prescription for eyeglasses corresponding to a lens usage purpose can easily be determined.

The judgment means is set so as to judge whether the subject lens is a spherical lens or an aspherical lens, by a spherical degree value distribution on the subject lens. Therefore, it can easily be known whether the subject lens is a spherical lens or an aspherical lens. Also, the judgment means is set so as to judge whether the subject lens is a spherical lens or an aspherical lens, by a spherical degree value and a prism value on the subject lens. Therefore, it can be more easily known whether the subject lens is a spherical lens or an aspherical lens. More specifically, when the value of the spherical degree of the circumferential portion of a subject lens is less than that of the center portion of the subject lens, it is judged that the subject lens is an aspherical lens. Also, the discrimination between the center portion and the circumferential portion of the subject lens is judged by the magnitude of the prism value. In the case of a progressive lens, the spherical degree value on the subject lens changes. However, when a portion with a great spherical degree is present in the circumferential portion of the subject lens as compared with the center portion, it is judged that the subject lens is a progressive power lens or a double focus lens.

In a case where the lens specifying apparatus is provided with lens measurement means for measuring lens optical characteristic distribution information of a subject lens and lens judgment means for judging whether the subject lens is a spherical lens or an aspherical lens based on a spherical degree value distribution on the subject lens measured by the lens measurement means, it can be easily and quickly ascertained whether the subject lens is a spherical lens or an aspherical lens. Further, in a case where the lens specifying apparatus is provided with lens measurement means for measuring lens optical characteristic distribution information of the subject lens and lens judgment means for judging whether the subject lens is a spherical lens or an aspherical lens based on a spherical degree value and a prism value on the subject lens measured by the lens measurement means, it can be more easily ascertained whether the subject lens is a spherical lens or an aspherical lens. In this case, when the spherical degree value of a circumferential portion of the subject lens is less than that of a center portion of the subject lens, it can be judged that the subject lens is an aspherical lens. The discrimination between the center portion and the circumferential portions can be judged by the magnitude of the prism value. In the case of a progressive lens, the spherical degree value of the subject lens varies, and when a portion with a great spherical degree is present in the circumferential portion of the subject lens as compared with the center portion, it can be judged whether the subject lens is a progressive power lens or a double focus lens. This judgment is formed by the magnitude of the prism value.

In a case where the lens judgment means calculates a degree of the aspherical surface from the optical center of the subject lens and instructs the display means to display the degree thereof, it can be ascertained whether the subject lens is an aspherical lens which is made for obtaining a good appearance only by thinning an edge-thickness of the subject lens, or an aspherical lens which is capable of obtaining the natural view without distortion. Moreover, in a case where the lens judgment means judges whether the subject lens is an aspherical progressive lens or an aspherical mono-focal lens based on a difference between the spherical degree values of at least two points on the subject lens and instructs the display means to display a judgment result, it is easy to specify and display the kind of the aspherical lens and, therefore, it is possible to quickly ascertain the kind thereof.

In a case where optical characteristics of the subject lens are measured at intervals of time and at a plurality of points on the subject lens, it can be easily and quickly judged whether the subject lens is a spherical lens or an aspherical lens without performing a mapping procedure which requires a lens array plate in which a plurality of small lenses are arrayed or a pattern plate in which a plurality of small holes are formed. In other words, when right and left lenses of eyeglasses are measured, it can be easily judged whether the right or left lens (subject lens) is a progressive lens or mono-focal lens and whether the mono-focal lens is a spherical lens or an aspherical lens, not by changing the basic construction of the lens meter, but simply by setting a program.

In a case where the specifying apparatus is provided with a measurement optical system for measuring lens refraction characteristics of the subject lens; lens measurement means, a part of an optical path of which is in common with the measurement optical system, for measuring and obtaining spectral transmittance of the subject lens; and display means for displaying the spectral transmittance of the measured subject lens, the spectral transmittance of the lens can be easily and quickly known through the optical path of the measurement optical system. As a result, even if one of the right and left lenses is broken and replaced with new one, the right and left lenses can be balanced best with each other from a comprehensive judgment. Furthermore, there is no need to move the lens measurement means onto another member when the spectral transmittance of the subject lens is measured. As a result, switching over can be performed in a moment between the measurement for the refraction characteristics of the subject lens and the measurement for the spectral transmittance thereof. Further, in a case where the refraction characteristics of the subject lens are measured on each point of the subject lens and are displayed in the form of a map, the spectral transmittance of each point of the subject lens can be exactly superimposed on the map.

In a. case where the lens measurement means comprises a light source for projecting a measuring beam of light onto the subject lens, a light receiving portion for receiving the measuring beam which has passed through the subject lens, and transmitted-wavelength selecting means disposed as means for obtaining the spectral transmittance in an optical path between the light source and the light receiving portion, the spectral transmittance can be also obtained when the lens refraction characteristics are measured with a simple construction.

While the present invention has been described with reference to preferred embodiments thereof, the invention is not to be limited to the details given herein, but may be modified within the scope of the appended claims.

What is claimed is:

1. A lens specifying apparatus comprising:

lens measurement means for measuring and obtaining lens refraction characteristic distribution information of a subject lens;

information recording means on which lens information has been recorded, including lens refraction characteristic distribution information corresponding to said measured lens refraction characteristic distribution information of said subject lens;

lens judgment means for comparing said subject lens refraction characteristic distribution information measured by said lens measurement means with said lens information recorded on said information recording means and determining which said recorded lens information the measured subject lens refraction characteristic distribution information agrees with or approximates to; and notification means for notifying a result determined by said lens judgment means.

2. The lens specifying apparatus as set forth in claim 1, wherein information that is obtained from said lens information by said lens judgment means is a maker's name.

3. The lens specifying apparatus as set forth in claim 1, wherein information that is obtained from said lens information by said lens judgment means is a maker's name and a model type.

4. The lens specifying apparatus as set forth in claim 1, wherein said information recording means records lens usage purpose information as lens information in correspondence with said lens refraction characteristic distribution information and wherein information that is obtained from said lens information by said lens judgment means is a lens usage purpose.

5. The lens specifying apparatus as set forth in claim 4, further comprising:

ophthalmic information input means for inputting ophthalmic information of a subject;

wherein said lens judgment means adds said ophthalmic information to said lens refraction characteristic distribution information and compares the added information and said lens information with each other to determine said lens usage purpose.

6. The lens specifying apparatus as set forth in claim 5, further comprising:

usage purpose input means for inputting a usage purpose such as an indoor purpose, a sport purpose, and a driving purpose;

wherein said lens judgment means determines whether or not the lens usage purpose obtained is suitable for the usage purpose input by said usage purpose input means.

7. The lens specifying apparatus as set forth in any one of claims 1 through 6, wherein said lens judgment means is equipped with means for obtaining spectral transmittance.

8. The lens specifying apparatus as set forth in claim 7, wherein said lens measurement means comprises a refraction characteristic measurement optical system for measuring refraction characteristics of the subject lens and a spectral transmittance measurement optical system for measuring spectral transmittance of the subject lens, said spectral transmittance measurement optical system having a part of an optical path in common with said refraction characteristic measurement optical system.

9. The lens specifying apparatus as set forth in claim 8, wherein said lens judgment means instructs said notification means to display the spectral transmittance of the subject lens measured by said lens measurement means.

10. The lens specifying apparatus as set forth in claim 7, wherein said lens measurement means further comprises a light source for projecting a measuring beam of light onto the subject lens, a light receiving portion for receiving the measuring beam which has passed through the subject lens, and transmitted-wavelength selecting means disposed as means for obtaining spectral transmittance in an optical path between said light source and said light receiving portion.

11. The lens specifying apparatus as set forth in claim 10, wherein said lens judgment means obtains refraction characteristics and spectral transmittance of the subject lens, based on an output from said light receiving portion, and instructs said notification means to display the obtained refraction characteristics and spectral transmittance.

12. The lens specifying apparatus as set forth in claim 10 wherein optical characteristics of the subject lens are measured at intervals of time and at a plurality of points on the subject lens.

13. The lens specifying apparatus as set forth in claim 1, wherein said lens judgment means is set so as to determine whether the subject lens is a spherical lens or an aspherical lens, by a spherical degree value distribution on the subject lens.

14. The lens specifying apparatus as set forth in claim 1, wherein said lens judgment means is set so as to determine whether the subject lens is a spherical lens or an aspherical lens, by a spherical degree value and a prism value on the subject lens.

15. The lens specifying apparatus as set forth in claim 1, wherein said lens judgment means calculates an aspherical variation of an aspherical surface from an optical center of the subject lens and instructs said notification means to display the variation thereof.

16. The lens specifying apparatus as set forth in claim 1, wherein said lens judgment means judges whether the subject lens is an aspherical progressive lens or an aspherical mono-focal lens, based on a difference between spherical degree values of at least two points on the subject lens, and instructs said notification means to display a judgment result.

\* \* \* \* \*